(12) United States Patent
Takamatsu et al.

(10) Patent No.: US 11,904,852 B2
(45) Date of Patent: Feb. 20, 2024

(54) INFORMATION PROCESSING APPARATUS, INFORMATION PROCESSING METHOD, AND PROGRAM

(71) Applicant: Sony Group Corporation, Tokyo (JP)

(72) Inventors: Shingo Takamatsu, Tokyo (JP); Kenta Kawamoto, Tokyo (JP); Naoki Ide, Tokyo (JP); Yoshiyuki Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 48 days.

(21) Appl. No.: 17/465,844

(22) Filed: Sep. 3, 2021

(65) Prior Publication Data

US 2021/0394751 A1     Dec. 23, 2021

Related U.S. Application Data

(63) Continuation of application No. 15/579,709, filed as application No. PCT/JP2016/065028 on May 20, 2016, now Pat. No. 11,142,195.

(30) Foreign Application Priority Data

Aug. 28, 2015 (JP) ................................ 2015-168527

(51) Int. Cl.
    *B60W 30/00*     (2006.01)
    *B60W 30/095*     (2012.01)
    (Continued)

(52) U.S. Cl.
    CPC ........... *B60W 30/0953* (2013.01); *G07C 5/08* (2013.01); *G08G 1/16* (2013.01); *B60R 21/00* (2013.01)

(58) Field of Classification Search
CPC ...... H01S 5/125; H01S 5/1085; H01S 5/1064; H01S 5/1003; H01S 2301/163
See application file for complete search history.

(56) References Cited

U.S. PATENT DOCUMENTS 5,594,414 A * 1/1997 Namngani ............. B60Q 9/008
                                                              340/904
7,167,799 B1 * 1/2007 Dolgov .................. G08G 1/164
                                                               701/469

(Continued)

FOREIGN PATENT DOCUMENTS

DE     10 2011 010 864 A1    12/2011
DE     10 2012 103 847 A1    11/2012

(Continued)

OTHER PUBLICATIONS

International Search Report dated Aug. 23, 2016 in PCT/JP2016/065028.

(Continued)

*Primary Examiner* — Ian Jen
(74) *Attorney, Agent, or Firm* — XSENSUS LLP

(57) ABSTRACT

[Object] To provide an information processing apparatus, an information processing method, and a program capable of providing more useful information to a driver.
[Solution] An information processing apparatus including: a prediction section configured to predict accident probability of a vehicle driven by a user; and an output control section configured to cause information to be output to the user, the information corresponding to a factor that increases the accident probability predicted by the prediction section.

30 Claims, 14 Drawing Sheets

(51) Int. Cl.
*G08G 1/16* (2006.01)
*G07C 5/08* (2006.01)
*B60R 21/00* (2006.01)

(56) References Cited

U.S. PATENT DOCUMENTS

| | | | |
|---|---|---|---|
| 7,194,347 B2* | 3/2007 | Harumoto | G08G 1/16 |
| | | | 340/436 |
| 7,848,884 B2* | 12/2010 | Kawasaki | G01C 21/26 |
| | | | 180/232 |
| 8,520,695 B1 | 8/2013 | Rubin et al. | |
| 8,838,372 B2* | 9/2014 | Noda | B60W 30/09 |
| | | | 382/103 |
| 9,099,006 B2* | 8/2015 | Mudalige | B60W 10/18 |
| 9,132,775 B2* | 9/2015 | Ohama | B60Q 9/008 |
| 2004/0193347 A1* | 9/2004 | Harumoto | G08G 1/166 |
| | | | 701/45 |
| 2005/0033516 A1* | 2/2005 | Kawasaki | G01C 21/26 |
| | | | 340/436 |
| 2005/0125121 A1* | 6/2005 | Isaji | G08G 1/165 |
| | | | 701/36 |
| 2007/0009137 A1* | 1/2007 | Miyoshi | G08G 1/166 |
| | | | 382/104 |
| 2007/0016785 A1* | 1/2007 | Guay | H04L 9/3236 |
| | | | 713/176 |
| 2007/0032929 A1 | 2/2007 | Yoshioka et al. | |
| 2008/0195261 A1* | 8/2008 | Breed | B60R 11/0241 |
| | | | 701/2 |
| 2009/0033540 A1* | 2/2009 | Breed | G06V 20/58 |
| | | | 701/472 |
| 2009/0189814 A1* | 7/2009 | Moriuchi | G01S 13/931 |
| | | | 342/75 |
| 2009/0192710 A1* | 7/2009 | Eidehall | B60W 50/0097 |
| | | | 701/300 |
| 2010/0049440 A1* | 2/2010 | Alfano | G08G 9/02 |
| | | | 701/301 |
| 2010/0121576 A1* | 5/2010 | Aso | G08G 1/16 |
| | | | 701/300 |
| 2011/0210866 A1 | 9/2011 | David et al. | |
| 2012/0188098 A1* | 7/2012 | Mochizuki | G08G 1/096783 |
| | | | 340/905 |
| 2013/0225117 A1* | 8/2013 | Giacoletto | H04W 4/06 |
| | | | 455/404.2 |
| 2013/0261951 A1 | 10/2013 | Sekiguchi et al. | |
| 2013/0282268 A1 | 10/2013 | Goerick et al. | |
| 2014/0067800 A1* | 3/2014 | Sharma | G06Q 50/30 |
| | | | 707/736 |
| 2014/0278059 A1* | 9/2014 | Gunther | G01C 21/3697 |
| | | | 701/414 |
| 2014/0292502 A1 | 10/2014 | Sakima et al. | |
| 2014/0309881 A1* | 10/2014 | Fung | G06F 17/00 |
| | | | 701/36 |
| 2015/0057891 A1* | 2/2015 | Mudalige | G08G 1/165 |
| | | | 701/42 |
| 2015/0360686 A1* | 12/2015 | Kim | B60W 30/12 |
| | | | 701/23 |
| 2015/0380686 A1 | 12/2015 | Yoshida et al. | |
| 2016/0047666 A1* | 2/2016 | Fuchs | G01C 21/3697 |
| | | | 701/423 |

FOREIGN PATENT DOCUMENTS

| | | |
|---|---|---|
| EP | 2743901 A1 | 6/2014 |
| EP | 3343535 A1 | 7/2018 |
| JP | 11-120478 A | 4/1999 |
| JP | 2007-47914 A | 2/2007 |
| JP | 2009003538 A | 1/2009 |
| JP | 2009-282873 A | 12/2009 |
| JP | 2010-152497 A | 7/2010 |
| JP | 2010-198552 A | 9/2010 |
| JP | 2010-237829 A | 10/2010 |
| JP | 2011-100298 A | 5/2011 |
| JP | 2011-113150 A | 6/2011 |
| JP | 2012-6468 A | 1/2012 |
| JP | 5077017 B2 | 11/2012 |
| JP | 2013078969 A | 5/2013 |
| JP | 2014197326 A | 10/2014 |
| JP | 2015-225366 A | 12/2015 |
| WO | WO-2012114382 A1 | 8/2012 |
| WO | WO-2013154169 A1 | 10/2013 |
| WO | WO-2017038166 A | 3/2017 |

OTHER PUBLICATIONS

Extended Search Report issued in European Application 16841198.1-1203 dated Jul. 18, 2019.
Richter, C., et al., "High-Speed Autonomous Navigation of Unknown Environments using Learned Probabilities of Collision", 2014 IEEE International Conference on Robotics & Automation (ICRA), 8 Pages total, (May 31-Jun. 7, 2014).
Weber, D.P., "Fuzzy Weibull for Risk Analysis", 1994 Proceedings Annual Reliability and Maintainability Symposium, 6 Pages total, (1994).
Office Action dated Sep. 8, 2020, in corresponding Japanese patent Application No. 2017-537581, 6 pages.

* cited by examiner

INFORMATION PROCESSING APPARATUS, INFORMATION PROCESSING METHOD, AND PROGRAM

CROSS-REFERENCE TO RELATED APPLICATIONS

This application is a continuation of U.S. application Ser. No. 15/579,709, filed Dec. 5, 2017, which is based on PCT filing PCT/JP2016/065028, filed on May 20, 2016, and claims priority to Japanese Application No. 2015-168527, filed on Aug. 28, 2015, the entire contents of each are incorporated herein by reference.

TECHNICAL FIELD

The present disclosure relates to an information processing apparatus, an information processing method, and a program.

BACKGROUND ART

In recent years, a traffic system that uses a sensor such as an onboard sensor or a surveillance camera on a road to promote the safety of a vehicle has attracted attention. In such a traffic system, information detected by a plurality of sensors is integrated, thereby extracting useful information. Notifying a driver of the information, treating the information as input information for automated driving, or the like is a use of the information.

As an example of such technology, for example, Patent Literature 1 below discloses a system that records a spot in which a driver is estimated to have felt danger while driving, and issues warning when the spot is approached.

CITATION LIST

Patent Literature

Patent Literature 1: JP 2007-47914A

DISCLOSURE OF INVENTION

Technical Problem

However, the technology disclosed in Patent Literature above merely issues warning on the basis of the past record. Therefore, in the case where the situation changes after the past record time, information provided to a driver is not useful in some cases. The present disclosure then proposes a novel and improved information processing apparatus, information processing method, and program capable of providing more useful information to a driver.

Solution to Problem

According to the present disclosure, there is provided an information processing apparatus including: a prediction section configured to predict accident probability of a vehicle driven by a user; and an output control section configured to cause information to be output to the user, the information corresponding to a factor that increases the accident probability predicted by the prediction section.

In addition, according to the present disclosure, there is provided an information processing method including: predicting accident probability of a vehicle driven by a user; and causing an output apparatus to output information to the user, the information corresponding to a factor that increases the predicted accident probability.

In addition, according to the present disclosure, there is provided a program for causing a computer to function as: a prediction section configured to predict accident probability of a vehicle driven by a user; and an output control section configured to cause information to be output to the user, the information corresponding to a factor that increases the accident probability predicted by the prediction section.

Advantageous Effects of Invention

As described above, according to the present disclosure, it is possible to provide more useful information to a driver. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
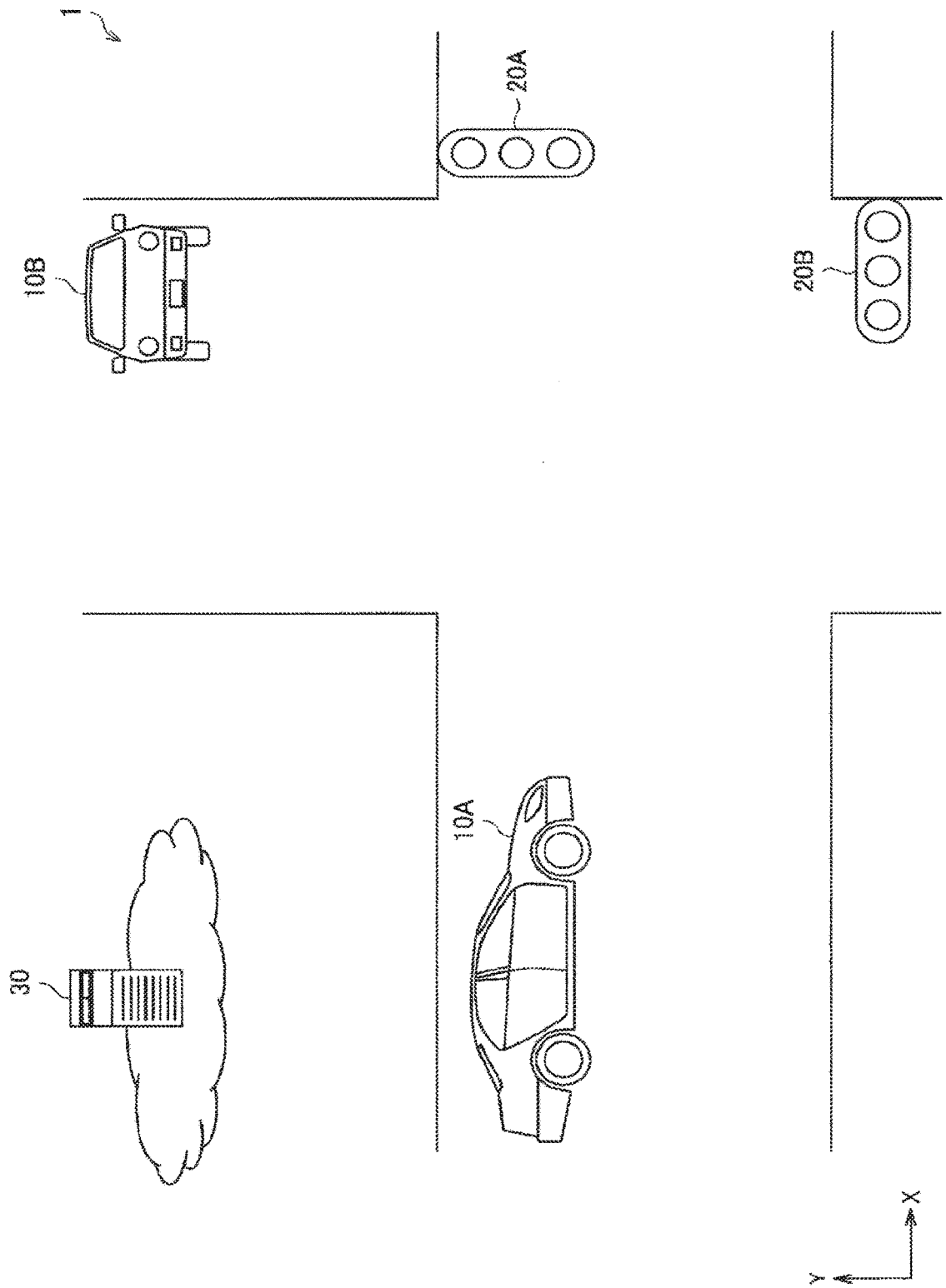
FIG. 1 is an explanatory diagram for describing an overview of a system according to the present embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be now made in the following order.
1. Introduction
1.1. Overview
1.2. Technical Problem
2. Configuration Examples
2.1. Configuration Example of Sensor Apparatus 100
2.2. Configuration Example of Server 30
3. Technical Features
4. Flow of Processing
5. Hardware Configuration Example
6. Conclusion

1. INTRODUCTION

1.1. Overview

First, the overview of a system 1 according to an embodiment of the present disclosure will be described with reference to FIG. 1.

FIG. 1 is an explanatory diagram for describing the overview of the system 1 according to the present embodiment. FIG. 1 illustrates the situation in which a vehicle 10A and a vehicle 10B are respectively traveling in an X direction and a -Y direction, and entering an intersection. For example, in the case where a driver of the vehicle 10A is not able to visually recognize the vehicle 10B, there is a possibility of a collision between the vehicle 10A and the vehicle 10B. The same applies to a driver of the vehicle 10B. In the situation in which the occurrence of such an accident is predicted, it is desirable to provide appropriate information to the drivers of the vehicles 10A and 10B.

Accordingly, the system 1 accumulates information detected by a variety of sensor apparatuses, predicts accident probability, and provides information based on a prediction result to a user.

A sensor apparatus (sensor apparatus 100 described with reference to FIG. 2) can be mounted, for example, on a mobile object such as the vehicles 10A and 10B. In addition, the sensor apparatus can be mounted, for example, on an infrastructure such as traffic lights 20A and 20B. For example, a sensor apparatus mounted on the vehicle 10A and a sensor apparatus mounted on the traffic light 20A perform sensing regarding the driver of the vehicle 10A or the vehicle 10A. Similarly, a sensor apparatus mounted on the vehicle 10B and a sensor apparatus mounted on the traffic light 20B perform sensing regarding the driver of the vehicle 10B or the vehicle 10B. Accumulating sensor information resulting from such sensing, the system 1 is capable of performing processing based on the accumulated sensor information. For example, the sensor apparatus mounted on the vehicle 10A is capable of providing information to the driver to avoid an accident with the vehicle 10B. Note that the sensor information acquired by the respective sensor apparatuses may be shared in the system 1.

Processing based on the accumulation of sensor information and accumulated sensor information may also be performed in a server 30. The server 30 can be provided, for example, on cloud computing. Implementing the server 30, for example, as a mobile edge computing (MEC) server provided to a base station of mobile communication is also effective in decreasing the latency of a service.

1.2. Technical Problem

With respect to the system 1 described above, Patent Literature 1 above discloses a system that records a spot in which a driver is estimated to have felt danger while driving a vehicle on the basis of information acquired by a sensor, and issues warning when the spot is approached. However, in the case where the situation changes after the past record time, information provided to the driver is not useful in some cases in the system disclosed in Patent Literature 1. Further, the driver merely receives the warning, but it is not clear to the driver in some cases what accident avoidance act the driver is to carry out specifically.

In view of such circumstances, the system 1 according to an embodiment of the present disclosure has been devised. In the system 1 according to the present embodiment, it is possible to predict accident probability and output, to a user, information corresponding to a factor that increases the accident probability.

In addition, as a mechanism for avoiding an accident, for example, a technique is possible of measuring the distance to a nearby different vehicle or pedestrian with a camera, a sensor, or the like to predict a collision, making an automatic stop, and the like. However, there can be a large quantity of information that has to be taken into consideration in addition to distance. Accordingly, the system 1 according to the present embodiment uses various kinds of information that can influence the occurrence of an accident to predict accident probability.

In addition, the cause of an accident is analyzed on the basis of accident cases, but analysis is sometimes difficult because of a small absolute number of accidents. Accordingly, the system 1 according to the present embodiment predicts accident probability by taking even a precursory phenomenon of an accident into consideration.

2. CONFIGURATION EXAMPLES

2.1. Configuration Example of Sensor Apparatus 100

Figure 2:
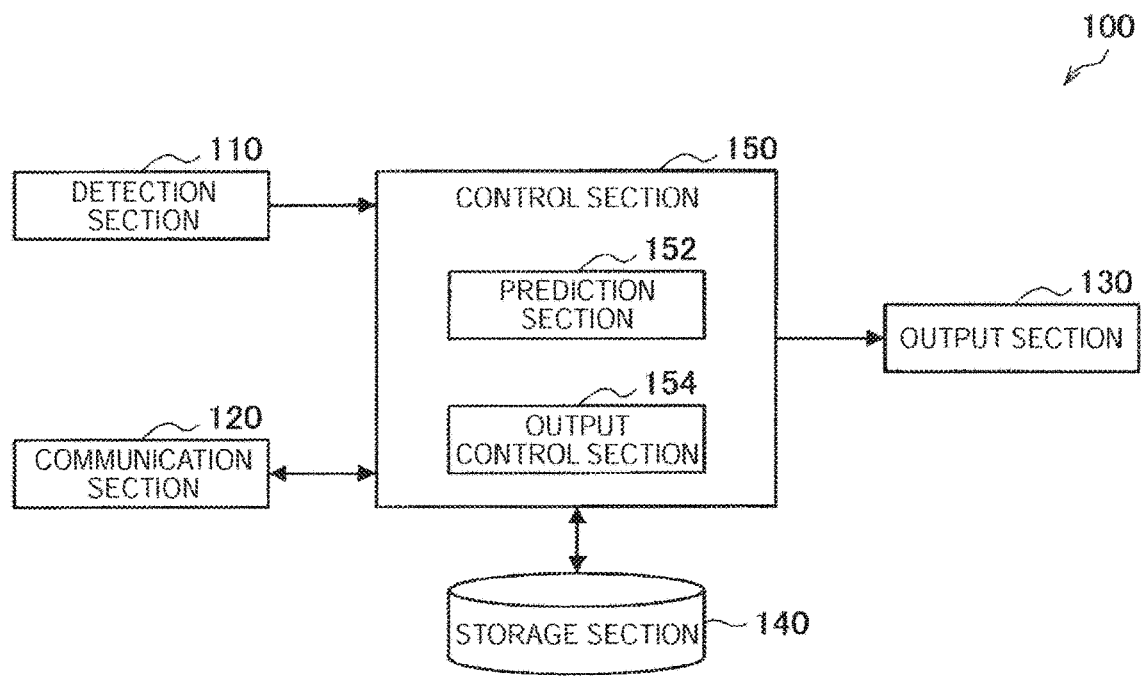
FIG. 2 is a block diagram illustrating an example of a logical configuration of a sensor apparatus according to the present embodiment.

FIG. 2 is a block diagram illustrating an example of the logical configuration of the sensor apparatus 100 according to the present embodiment. As illustrated in FIG. 2, the sensor apparatus 100 includes a detection section 110, a communication section 120, an output section 130, a storage section 140, and a control section 150.

(1) Detection Section 110

The detection section 110 detects various kinds of information regarding a vehicle, a vehicle compartment, a passenger (driver or occupant), an environment around the vehicle, and the like. The detection section 110 includes a variety of sensors such as a camera, a radar, an inertial sensor or a biological information sensor, and outputs detected sensor information.

(2) Communication Section 120

The communication section 120 is a communication module for transmitting and receiving data to and from another apparatus in a wired/wireless manner. For example, the communication section 120 communicates with another sensor apparatus 100 or the server 30.

(3) Output Section 130

The output section 130 outputs information by using video, an image, sound, vibration, or the like. For example, in the case where the sensor apparatus 100 is mounted on a vehicle, the output section 130 outputs information to a passenger. In addition, in the case where the sensor apparatus 100 is mounted on a traffic light, the output section 130 outputs information to a passenger of a nearby vehicle or a nearby pedestrian.

(4) Storage Section 140

The storage section 140 temporarily or permanently stores programs and various kinds of data for the operation of the sensor apparatus 100.

(5) Control Section 150

The control section 150 provides various functions of the sensor apparatus 100. The control section 150 includes a prediction section 152 and an output control section 154. Note that the control section 150 can further include other constituent elements in addition to these constituent elements. That is, the control section 150 can perform other operations in addition to the operations of these components. The operations of the prediction section 152 and the output control section 154 will be described in detail below.

2.2. Configuration Example of Server 30

Figure 3:
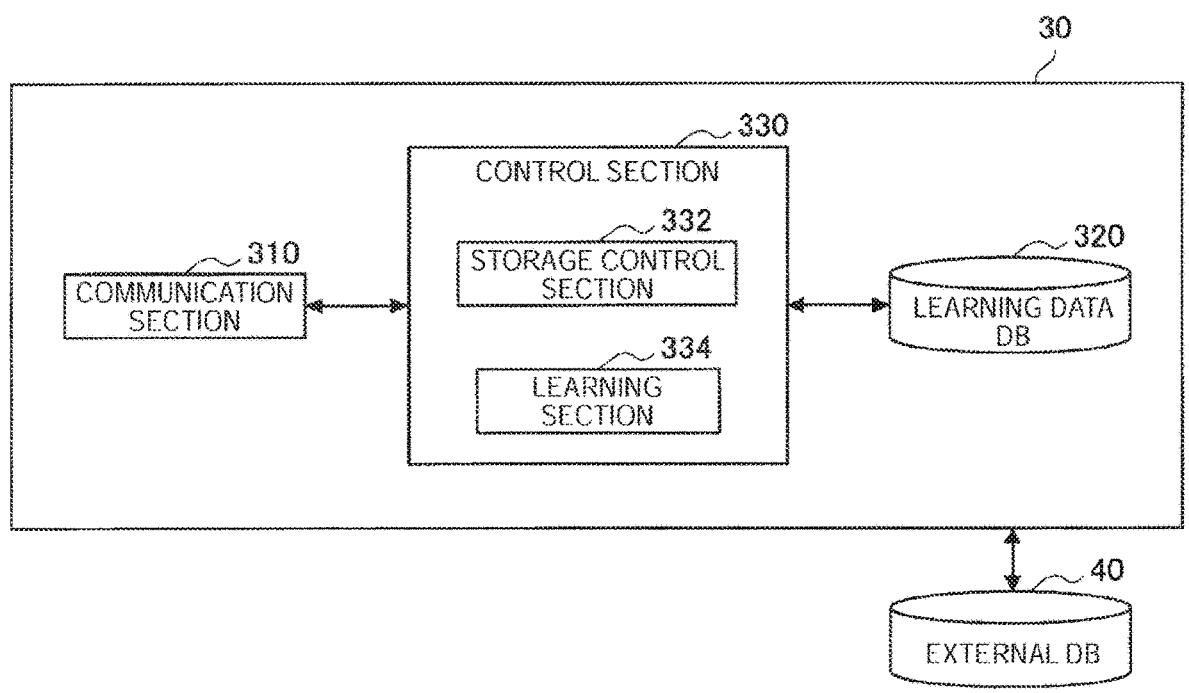
FIG. 3 is a block diagram illustrating an example of a logical configuration of a server according to the present embodiment.

FIG. 3 is a block diagram illustrating an example of the logical configuration of the server 30 according to the present embodiment. As illustrated in FIG. 3, the server 30 includes a communication section 310, a learning data data base (DB) 320, and a control section 330.

(1) Communication Section 310

The communication section 310 is a communication module for transmitting and receiving data to and from another apparatus in a wired/wireless manner. For example, the communication section 310 communicates with the sensor apparatus 100 or an external DB 40.

(2) Learning Data DB 320

The learning data DB 320 stores learning data. The learning data is information including a feature vector and accident information. The accident information may be acquired from the sensor apparatus 100 connected to the system 1, or from the external DB 40. The accident information is information including the presence or absence of accident occurrence, and, in the case where an accident occurs, the details of the accident (geographical position, type of accident, occurrence date and time, occurrence circumstances, attributes of a perpetrator and a victim, and identification information of a vehicle related to the accident). The external DB 40 is a DB that is used, for example, by the press, transportation, country or the like, and accumulates accident information. Note that the accident herein refers to a so-called traffic accident such as an accident resulting in injury or death, or an accident resulting in property damage.

(3) Control Section 330

The control section 330 provides a variety of functions of the server 30. The control section 330 includes a storage control section 332 and a learning section 334. Note that the control section 330 can further include other components in addition to these components. That is, the control section 330 can perform other operations in addition to the operations of these components. The operations of the storage control section 332 and the learning section 334 will be described in detail below.

3. TECHNICAL FEATURES

Next, technical features of the system 1 according to the present embodiment will be described. The following describes technical features, focusing on one sensor apparatus 100 mounted on a vehicle. The vehicle on which the sensor apparatus 100 is mounted is also referred to as own vehicle, and another vehicle is also referred to as different vehicle. In addition, a sensor apparatus other than the sensor apparatus 100 of interest is also referred to as another sensor apparatus.

(1) Accident Probability Prediction

The sensor apparatus 100 (e.g., prediction section 152) predicts the accident probability of a vehicle (own vehicle) driven by a user (driver). Note that a driver will refer to a driver of an own vehicle below unless stated in particular.

The sensor apparatus 100 predicts accident probability on the basis of a feature regarding a driver or an own vehicle. This makes it possible to predict the accident probability personalized for the driver or the own vehicle. In addition, the sensor apparatus 100 may predict accident probability on the basis of a feature regarding a different vehicle. This makes it possible to predict the accident probability that is personalized for the driver or the own vehicle and also takes into consideration the relationship with the different vehicle. A feature vector that is a combination of one or more features can be used to predict accident probability. A specific example of the feature vector will be described in detail below.

The sensor apparatus 100 predicts accident probability by a variety of methods. The following describes, as an example, a prediction method that uses a logistic regression model. An example of a prediction formula is shown as an equation (1) below.

[Math. 1]
$$p(y=1 \mid x, w) = \frac{1}{1 + \exp(-w^t x)} \quad (1)$$

Here,

[Math. 2]
$$y \in \{1, 0\} \quad (2)$$

shows whether an accident occurs or not. More specifically, y=1 shows that an accident occurs, and y=0 shows that no accident occurs.

[Math. 3]
$$x \in R^d \quad (3)$$

represents a feature vector, and is a numeric vector into which information necessary to predict an accent is converted. d represents the dimensionality of the feature.

[Math. 4]

$$w \in R_d \quad (4)$$

is a parameter, and is set/updated according to mechanical learning. A prediction model (i.e., parameter w) learned in the server 30 is used for the prediction of the sensor apparatus 100 (e.g., prediction section 152).

The server 30 (e.g., storage control section 332 and learning data DB 320) accumulates a feature vector x transmitted from each vehicle (more strictly, the sensor apparatus 100 mounted on each vehicle). Further, the server 30 accumulates accident information transmitted from each vehicle or the external DB 40. Therefore, the server 30 retains a large number of pairs (x, y). The server 30 (e.g., learning section 334) uses this pair as learning data to learn a prediction model (e.g., parameter w).

For example, it will be described how learning data for learning a prediction model for predicting the accident probability after a predetermined time (e.g., one minute later) is. The learning data includes the pair of the feature vector x acquired at the timing at which an accident occurs within the predetermine time (e.g., within one minute) and y=1. In addition, the learning data includes the pair of the feature vector x acquired at the timing at which no accident occurs within the predetermine time (e.g., within one minute) and y=0.

(2) Feature Vector

The sensor apparatus 100 (e.g., prediction section 152) acquires a feature vector used to predict accident probability. The feature vector may be generated in the sensor apparatus 100 or generated in another apparatus (e.g., server 30 or another sensor apparatus 100). As an example, the case will be described where a feature vector is generated in the sensor apparatus 100. For example, the sensor apparatus 100 (e.g., prediction section 152) generates a feature vector on the basis of sensor information detected by the detection section 110 or information acquired by the communication section 120 from another apparatus (e.g., another sensor apparatus 100, server 30, or the like). It is assumed that a symbol feature is converted into a numeric vector as a one-of-k feature vector.

The sensor apparatus 100 (e.g., prediction section 152) couples one or more acquired feature vectors. The sensor apparatus 100 inputs this coupled feature vector into a prediction model to predict accident probability.

The feature vector can be categorized, for example, into a driving feature vector or an attribute feature vector. The driving feature vector is a feature vector based on sensor information detected in real time. Specifically, the driving feature vector may also be a feature vector regarding real-time driving every predetermined period (every 10 seconds, or the like). The driving feature vector is used to predict accident probability, thereby making it possible to predict accident probability in accordance with a real-time situation. The attribute feature vector is a feature vector based on accumulated or registered information. Specifically, the attribute feature vector may also be a feature vector regarding a characteristic of a driver or an own vehicle. The attribute feature vector is used to predict accident probability, thereby making it possible to predict accident probability in accordance with a driver or a characteristic of an own vehicle.

A feature vector can also be used to learn a prediction model of accident probability. Therefore, the sensor apparatus 100 (e.g., communication section 120) regularly transmits sensor information or a feature vector to the server 30. At that time, it is assumed that the sensor apparatus 100 transmits sensor information or a feature vector in association with the identification information of an own vehicle, the presence or absence of an accident, and, in the case where an accident occurs, information showing the details thereof.

The sensor apparatus 100 (e.g., communication section 120) may transmit sensor information or a feature vector alone in a period of time for which a prediction result of accident probability is greater than or equal to a threshold. In addition, the sensor apparatus 100 may also transmit sensor information or a feature vector alone in a predetermined period of time before and after the time at which an accident or a precursory phenomenon described below occurs. These allow for decrease in data transmission amount. In addition, these prevent a prediction model from being excessively adapted to learning data in which an accident or a precursory phenomenon thereof does not occur.

The following specifically describes a driving feature vector and an attribute feature vector.

(2.1) Driving Feature Vector

The following shows an example of an item of a feature vector that can be included in a driving feature vector. The driving feature vector is generated by coupling one or more feature vectors whose example is shown below.

(External Object Information)

External object information is a feature vector regarding an object that is detected by a camera, a radar, or the like, and is present outside an own vehicle. The external object information can include, for example, the coordinates, size, speed and direction, and acceleration and direction, the reliability of information, and detection time of an object.

(Vehicle Movement Information)

Vehicle movement information is a feature vector showing the movement state of an own vehicle detected by an acceleration sensor or the like. The vehicle movement information can include, for example, the speed and acceleration of an own vehicle, and the directions thereof (Vehicle Operation Information)

Vehicle operation information is a feature vector showing the operation state of an own vehicle by a driver. The vehicle operation information can include, for example, the following information.

Whether blinkers are in operation or not
Whether a windshield wiper is in operation or not
The angle of each mirror
Whether each window is open or not, and the degree of openness
Whether a light is on or not
The position of a shift lever
The degree to which to step on a brake
The degree to which to step on an accelerator
Whether to step on a clutch pedal or not (Biological Information)

Biological information is a feature vector showing biological information of a passenger (driver, in particular). The biological information can include information showing, for example, blood pressure, a heart rate, body temperature, blood sugar, and the amount of perspiration. The biological information can be detected by a biological information sensor provided to a vehicle compartment. Alternatively, the biological information can be detected by a biological information sensor provided to a mobile device carried by a passenger, and transmitted to the system 1 (e.g., sensor apparatus 100 mounted to a vehicle in which the passenger rides). The biological information may also be a statistic such as the average of chronological variations in a measurement.

(Biological Condition Information)

Biological condition information is a feature vector that is estimated on the basis of biological information and shows the condition of a passenger. The biological condition information can include information showing the degree of concentration, the degree of hunger, the degree of sleepiness, or the like. These kinds of information can be estimated, for example, on the basis of the blood sugar level, the frequency of blinking, the degree of line-of-sight deviation, or the like.

(Vehicle Compartment Environment Information)

Vehicle compartment environment information is a feature vector showing a vehicle compartment environment. The vehicle compartment environment information can include information showing, for example, the number of passengers. The information showing the number of passengers can be recognized, for example, by a camera or a pressure sensing sensor provided onto a seat of a vehicle compartment. The vehicle compartment environment information can include information showing, for example, temperature, humidity, or atmospheric pressure. The vehicle compartment environment information can include information showing, for example, the degree to which a window is fogged. The information showing the degree to which a window is fogged can be recognized, for example, on the basis of a captured image of the window taken by a camera of a vehicle compartment. The vehicle compartment environment information can include information showing, for example, whether conversations are being carried out or not. The information showing whether conversations are being carried out or not can be recognized, for example, on the basis of sound picked up by a microphone of a vehicle compartment. The vehicle compartment environment information can include information showing, for example, the volume of music. The information showing the volume of music may be, for example, the setting value of the car stereo or recognized on the basis of sound picked up by a microphone of a vehicle compartment. The vehicle compartment environment information may also be a statistic such as the average of chronological variations in a measurement.

(Driver Physical Condition Information)

Driver physical condition information is a feature vector showing the physical condition of a driver. The driver physical condition information can include information showing, for example, the line of sight of a driver. The information showing the line of sight of a driver may be information showing, for example, the movement of an eyeball in a predetermined period, and the condition of the pupil and a change therein, and recognized with image recognition based on a captured image obtained by imaging the eyeball. The driver physical condition information can include information showing, for example, how to turn the steering wheel. The information showing how to turn the steering wheel may be information showing, for example, a pattern of turning the steering wheel, or may also be a statistic such as the average of chronological variations in the angular velocity of the steering wheel. The driver physical condition information can include information showing, for example, how to grip the steering wheel. The information showing how to grip the steering wheel may be information showing, for example, whether the steering wheel is gripped by both hands or not, or the place of gripping, and can be recognized with image recognition or a sensor provided to the steering wheel. The driver physical condition information can include information showing, for example, the attitude of a driver. The information showing the attitude of a driver may be information showing, for example, the condition (positions and angles of the seating face and the back face) of a seat, and can be recognized by a sensor provided to the seat. The driver physical condition information may be information showing, for example, whether a driver fastens his or her seat belt or not, and can be recognized by a sensor to the buckle of the seat belt.

(Weather Information)

Weather information is a feature vector showing the weather of a driving place of an own vehicle. The weather information can include, for example, the following information.

The presence or absence of rain or snow
Temperature and humidity
The presence or absence of fog (Driving Route Information)

Driving route information is a feature vector showing the condition of a driving route of an own vehicle. The driving route information can be recognized, for example, on the basis of an image recognition result of a captured image taken by a vehicle-outside camera or map information. The driving route information can include, for example, the following information.

A slope or not
A freeway or not
A bridge or not
A paved driving road or not (Accident Information Associated with Map)

Accident information associated with a map is a feature vector showing an accident that occurred in the past, and includes information associated with position information of an accident occurrence place. For example, a feature vector of a certain intersection or curve is created and coupled from each item of information of an accident that occurred within a predetermined distance from the intersection or the curve. As a feature vector used to predict accident probability, the sum of the feature vectors of an intersection or a curve that is predicted to be passed by an own vehicle within a predetermined time can be employed. Note that the intersection or the curve that is predicted to be passed by an own vehicle within a predetermined time is considered to be an intersection or a curve that is predicted to be passed in the case where it is assumed that the own vehicle travels straight along the road, and the speed of the own vehicle at the time of prediction is maintained.

(Cumulative Driving Time Information)

Cumulative driving time information is a feature vector showing the cumulative value of driving time of a driver. For example, the cumulative value of driving time can be the cumulative value from last parking.

(2.2) Attribute Feature Vector

The following shows an example of an item of a feature vector that can be included in an attribute feature vector. The attribute feature vector is generated by coupling one or more feature vectors whose example is shown below.

(Driving History Information)

Driving history information is a feature vector showing a driving history of a driver in the most recent predetermined period (e.g., one year). As the information showing a driving history, for example, information of the speed, driving route, braking timing or the like of an own vehicle can be included. The driving history information may also be a statistic such as the average of chronological variations in a measurement. The driving history information may be associated with a driver or an own vehicle.

(Driver Attribute Information)

Driver attribute information is a feature vector of attribute information of a driver. The driver attribute information can include, for example, the years of experience in driving, age, sex, and the like of a driver.

(Vehicle Attribute Information)

Vehicle attribute information is a feature vector of attribute information of an own vehicle. The vehicle attribute information can include, for example, the type of car, model name, the fuel consumption, the year of manufacture, the past repair history, and the like.

(Driving Proficiency Level Information)

Driving proficiency level information is a feature vector showing the driving proficiency level of a driver. The driving proficiency level information is expressed, for example on a five-point scale, and can be reported by a driver. The sensor apparatus 100 (e.g., control section 150) can set a driving proficiency level for a driver who does not report his or hers with a regression model. Therefore, the sensor apparatus 100 treats a driving proficiency level as a response variable and inputs as driving history information and driving attribute information, and creates a regression model with machine learning.

(Driver's Habit Information)

A driver's habit information is a feature vector showing a driver's habit. The driver's habit information is, for example, the ID of a cluster to which a target driver belongs in a clustering result with respect to driving history information of a plurality of drivers. Clustering can be carried out, for example, in the server 30. Clustering can be carried out by defining habit labels for some drivers in advance, learning a category model with machine learning as a category issue that treats inputs with respect to the respective habit labels as driving history information, and providing a habit label to a driver. As a specific habit, for example, changing lanes frequently, roughly driving, or the like is included.

(2.3) Supplemental Information

When predicting accident probability, for example, the sensor apparatus 100 (e.g., prediction section 152) couples and uses the respective feature vectors described above. At that time, a feature vector actually acquired at the time of predicting accident probability may be coupled, or a feature vector predicted to be acquired at prediction target time (e.g., one minute later) may be coupled.

In addition, the sensor apparatus 100 can couple and use not only a feature vector of an own vehicle, but also a feature vector of a different vehicle in the vicinity. For example, the sum of feature vectors of one or more different vehicles predicted to be positioned (pass in the case where it is assumed that the one or more different vehicles travel straight along the road, and the current speed is maintained) in the vicinity (e.g., within 100 m) a predetermined time later (e.g., 30 seconds later) may be coupled.

In addition, a pair of feature vectors may be treated as one feature vector. For example, a driver's habit information is combined with accident information associated with a map, so that a specific habit of a driver that is likely to lead to a specific accident can be expressed and accuracy in predicting accident probability can be improved.

(3) Learning

The server 30 (e.g., learning section 334) learning a prediction model used for the sensor apparatus 100 to predict accident probability.

For example, the server 30 learns the parameter w in the equation (1) above on the basis of feature vectors accumulated in the learning data DB 320 and information showing the presence or absence of accident occurrence. The server 30 (e.g., communication section 310) then notifies all the sensor apparatuses 100 connected to the system 1 of information (e.g., parameter w) showing a learning result. A common prediction model is used among the plurality of sensor apparatuses 100, but feature vectors are personalized. Accordingly, it is possible to predict personalized accident probability.

The sensor apparatus 100 (e.g. storage section 140) stores the information showing a learning result of which the sensor apparatus 100 is notified by the server 30. At the time of prediction, the sensor apparatus 100 (e.g., prediction section 152) then uses the stored information to construct a prediction model. Therefore, the sensor apparatus 100 does not have to communicate with the server 30 at the time of prediction.

The server 30 may learn a prediction model by also taking into consideration the probability of the occurrence of a precursory phenomenon (so-called near miss) of an accident such as abrupt steering or hard braking in addition to an accident. This allows the sensor apparatus 100 (e.g., prediction section 152) to predict accident probability by using the prediction model learned by taking into consideration the probability of the occurrence of a precursory phenomenon of an accident. Taking it into account that a driver is notified (typically warned) of a prediction result of accident probability, it is possible to prevent not only an accident, but also a precursory phenomenon thereof from occurring. Accordingly, it is possible to further promote the safety of an own vehicle. Here, to generate a prediction model that takes a precursory phenomenon into consideration to predict accident probability, it is assumed that the sensor apparatus 100 transmits sensor information or a feature vector to the server 30 in association with identification information of an own vehicle, information showing the presence or absence of a precursory phenomenon and information showing the details of a precursory phenomenon in the case where the precursory phenomenon occurs.

Note that, with respect to abrupt steering, abrupt steering can be determined in the case where a change in the rotation acceleration of the steering wheel, and changes in the acceleration and direction of an own vehicle are each greater than or equal to a threshold. With respect to hard braking, hard braking can be determined in the case where a change in the degree to which to step on the brake pedal, and a change in the acceleration of an own vehicle are each greater than or equal to a threshold. Note that a precursory phenomenon of an accident may additionally include ignoring the traffic light, engine stalling, running off the road, slipping, hydroplaning, or the like.

The following describes an example of a method for using a precursory phenomenon to predict accident probability.

First Example

For example, the server 30 (e.g., learning section 334) learns a prediction model (e.g., a model similar to that of the equation (1)) of the probability of the occurrence of a precursory phenomenon similarly to a prediction model of accident probability. The server 30 then includes the probability of the occurrence of a precursory phenomenon in a feature vector, and learns a prediction model related to accident probability. The sensor apparatus 100 (e.g., prediction section 152) first predicts the probability of the occurrence of a precursory phenomenon, and then couples the probability of the occurrence of a precursory phenomenon to a feature vector to predict accident probability.

Second Example

For example, the server 30 (e.g., learning section 334) regards the prediction of the probability of the occurrence of a precursory phenomenon as another task of the prediction of accident probability, and carries out transfer learning. Here,

[Math. 5]

$$z \in \{1, 0\} \quad (5)$$

is introduced that shows whether a precursory phenomenon occurs or not. z=1 shows that a precursory phenomenon occurs, and z=0 shows that no precursory phenomenon occurs.

The server 30 learns a prediction model of the probability of the occurrence of a precursory phenomenon with a logistic regression model similarly to a prediction model of accident probability. It is assumed that a parameter resulting from learning is w'. The server 30 uses the evaluation function of the following formula to learn a prediction model of accident probability.

[Math. 6]

$$\sum_{i=1}^{n} \{y_i \times \log(p(y_i = 1 \mid x_i, w)) + (1 - y_i) \times \log(1 - p(y_i = 1 \mid x_i, w))\} + \alpha \|w - w'\|^2 \quad (6)$$

Here, n represents the number of pieces of learning data, and a represents any constant. The first term above represents likelihood. The second term above allows the server 30 to learn a prediction model of accident probability by taking into consideration a prediction model of the probability of the occurrence of a precursory phenomenon (such that an output as a prediction model gets too far).

(4) User Interface

The sensor apparatus 100 outputs information regarding a prediction result of accident probability (e.g., the output control section 154 causes the output section 130 to make an output). The following describes a UI example in which the sensor apparatus 100 is mounted on a vehicle with reference to FIGS. 4 to 13. FIGS. 4 to 13 are diagrams for describing UI examples according to the present embodiment.

(4.1) UI Regarding Accident Probability Itself

Figure 4:
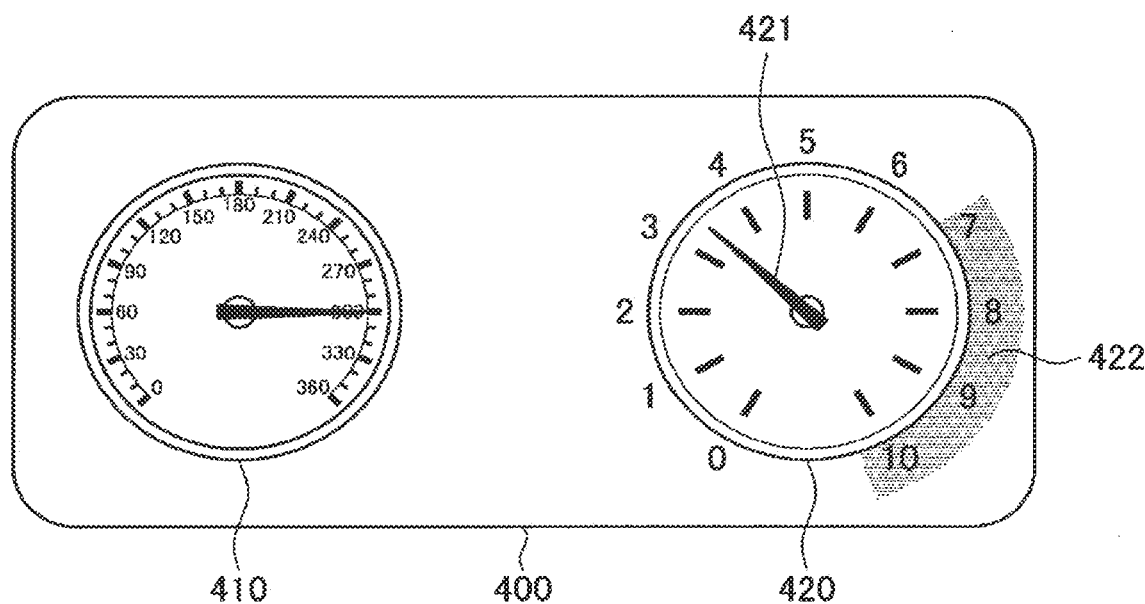
FIG. 4 is a diagram for describing a UI example according to the present embodiment.

The sensor apparatus 100 may output information showing accident probability to a driver. This allows the driver to drive while grasping the fluctuation in accident probability in real time. A UI example is illustrated in FIG. 4. In the example illustrated in FIG. 4, a speed meter 410 and an accident probability meter 420 are disposed on an instrument panel 400 (output section 130). The accident probability meter 420 has a scale from 0 to 10 along the edge of a circle. The accident probability meter 420 outputs accident probability by using a needle 421 to point to the graduation corresponding to the value obtaining by multiplying predicted accident probability (from 0 to 1) by ten. The needle 421 pivots on the center of a circle. In the accident probability meter 420, an area 422 having high values is emphasized.

Figure 5:
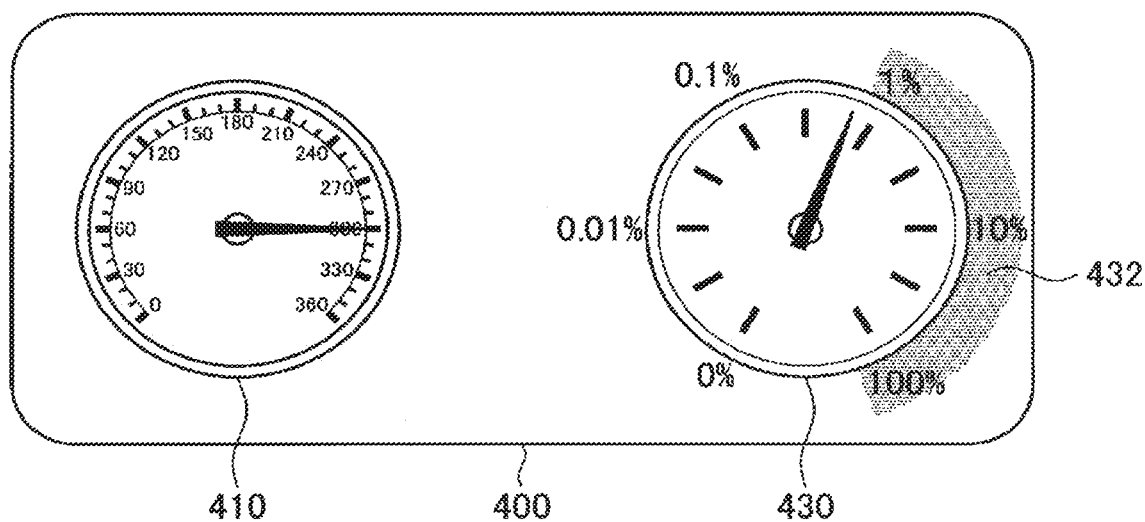
FIG. 5 is a diagram for describing a UI example according to the present embodiment.

The sensor apparatus 100 may output accident probability on a logarithmic scale. If it is taken into consideration that the frequency with which an accident occurs is low in general, expressing accident probability as a logarithm prevents the accident probability from looking like a value near 0% suddenly switches to a value near 100%. A UI example is illustrated in FIG. 5. In the example illustrated in FIG. 5, the speed meter 410 and an accident probability meter 430 are disposed on the instrument panel 400 (output section 130). In the accident probability meter 430, as shown by the scale on the edge of a circle, accident probability is expressed on a logarithmic scale. In the accident probability meter 430, an area 432 having high values is emphasized.

Figure 6:
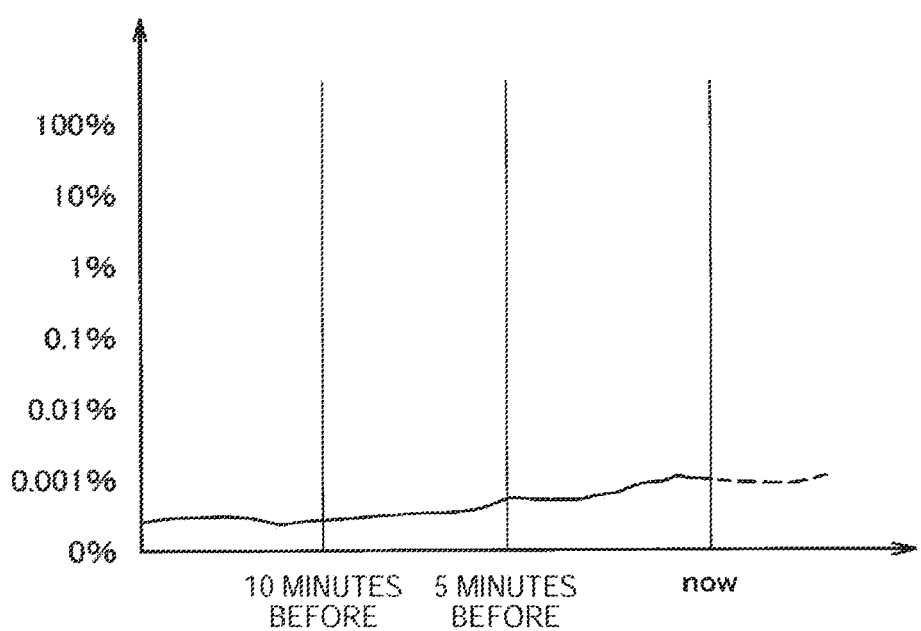
FIG. 6 is a diagram for describing a UI example according to the present embodiment.

The sensor apparatus 100 may output information showing a chronological transition of accident probability. This allows the driver to drive while grasping the fluctuation in accident probability from the past to the present in real time. Further, the sensor apparatus 100 may output a chronological transition of accident probability from the present to the future on the basis of a prediction result of future accident probability. A UI example is illustrated in FIG. 6. The UI illustrated in FIG. 6 shows a chronological transition of accident probability. The vertical axis represents accident probability, and the horizontal axis represents time. The UI illustrated in FIG. 6 can be displayed on a display provided to, for example, an instrument panel or a car navigation system.

Figure 7:
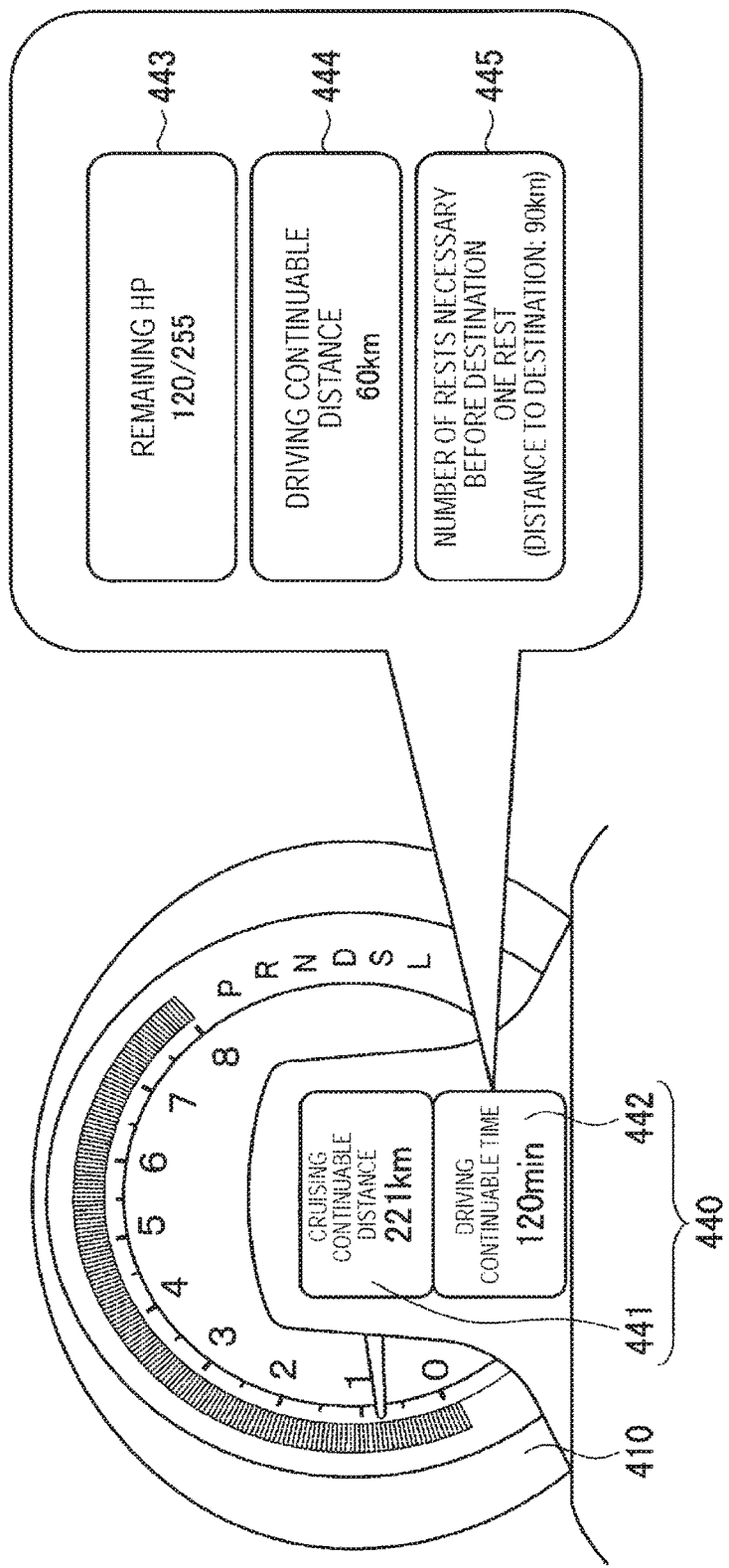
FIG. 7 is a diagram for describing a UI example according to the present embodiment.

The sensor apparatus 100 may output information based on a cumulative value of accident probability. For example, the sensor apparatus 100 first subtracts or adds a correction term based on biological condition information such as the degree of concentration, the degree of hunger, or the degree of sleepiness from a standard value such as 90 minutes from the driving start which is defined in advance, thereby calculating driving continuable time. The sensor apparatus 100 then calculates a cumulative value of accident probability from the driving start, and decreases and outputs the driving continuable time or driving continuable distance calculated on the basis of the driving continuable time as the cumulative value increases. Such an output prompts a driver to concentrate more on driving or take a rest as the cumulative value increases. Accordingly, it is possible to further promote safety. A UI example is illustrated in FIG. 7. In the UI illustrated in FIG. 7, cruising continuable distance calculated on the basis of the remaining fuel is displayed on a upper part 441 of a display 440 provided to the central part of the speed meter 410, and the above-described driving continuable time is displayed on a lower part 442. As display items based on the cumulative value of accident probability, it is possible to additionally conceive of an item 443 showing the remaining vital value (HP), an item 444 showing driving continuable distance, and an item 445 showing the number of rests necessary before a destination.

Figure 8:
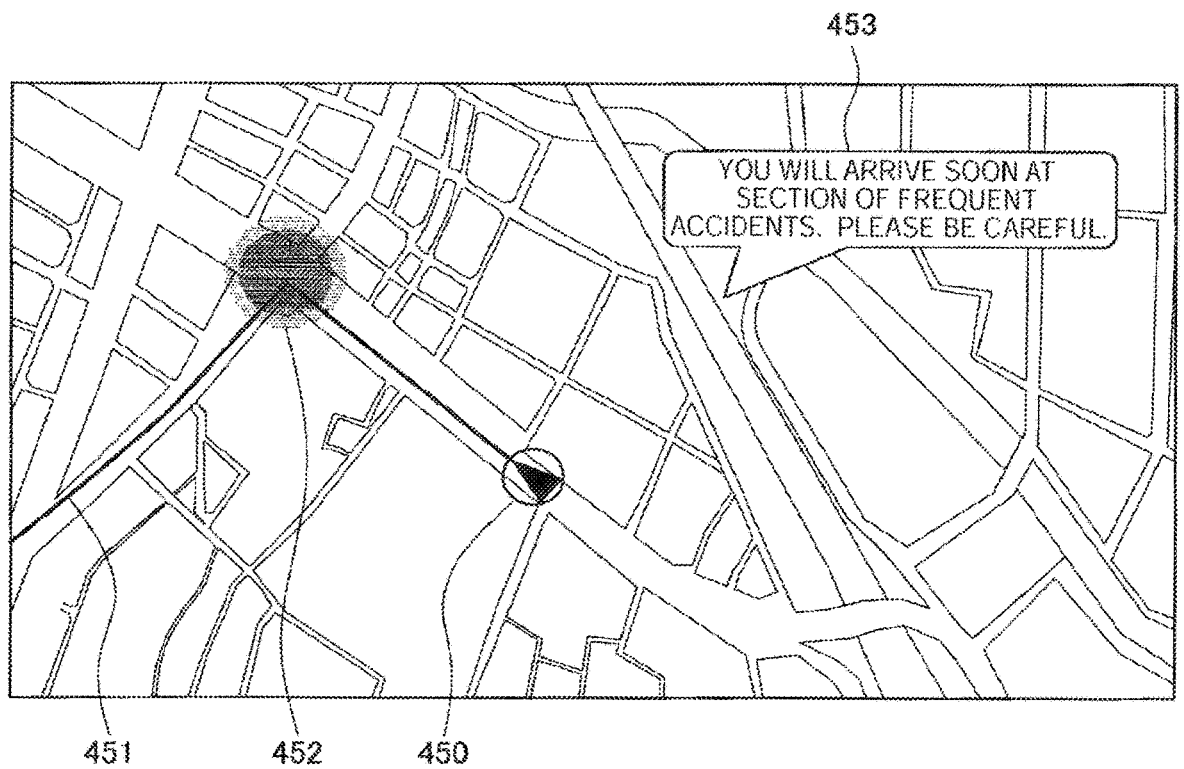
FIG. 8 is a diagram for describing a UI example according to the present embodiment.
Figure 9:
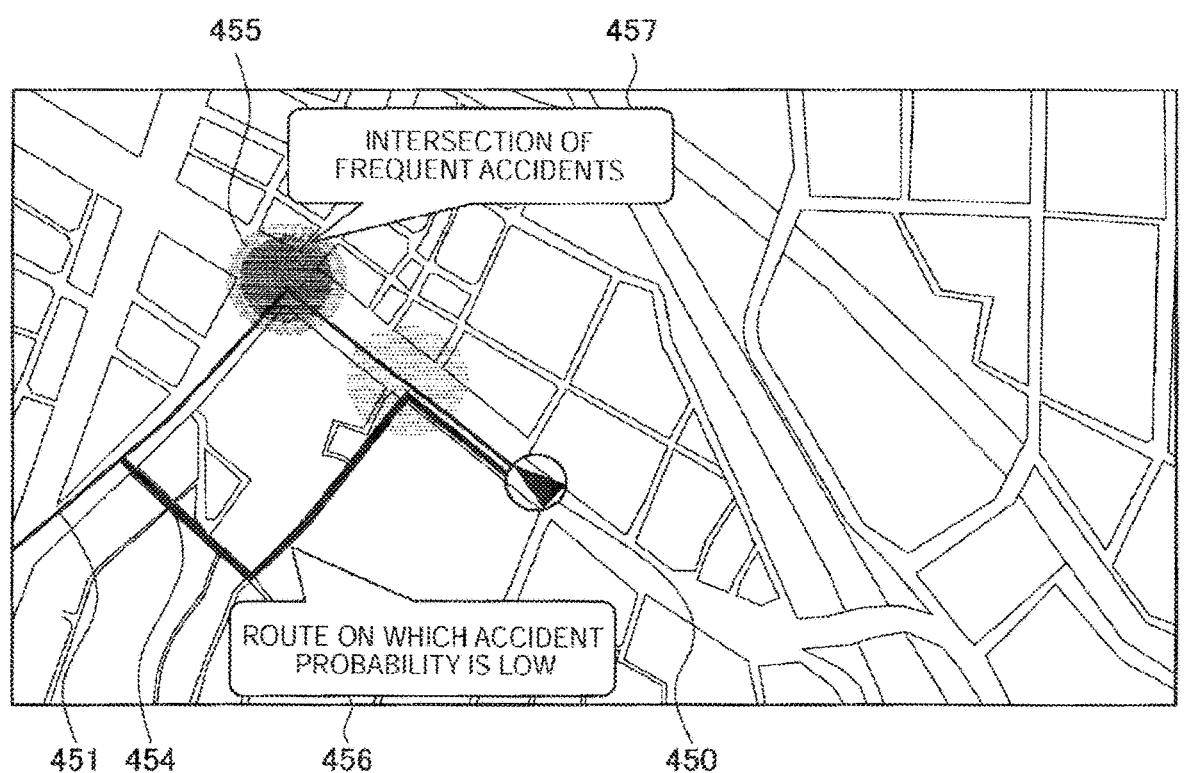
FIG. 9 is a diagram for describing a UI example according to the present embodiment.

The sensor apparatus 100 may output information regarding accident probability onto a map. For example, the sensor apparatus 100 uses a prediction model constructed with an attribute feature model alone to predict the accident probability of an intersection or a curve, and outputs information showing a spot whose accident probability exceeds a threshold. In that case, it is desirable to predict accident probability after a feature vector of "accident information associated with a map" is updated in accordance with an intersection or a curve on a planned driving route. Outputting information showing a spot whose accident probability exceeds a threshold makes it possible to alert a driver to a place in which an accident is likely to occur, and promote safety. For a similar purpose, information showing a place in which an accident occurred in the past may also be output. In addition, the sensor apparatus 100 may output information showing a route on which accident probability is low. In that case, it is possible to prompt a driver to drive on a safe route, and promote safety. For a similar purpose, information showing a route on which no accident occurred in the past or few accidents occurred in the past may also be output. UI examples are illustrated in FIGS. 8 and 9. In the UI illustrated in FIG. 8, a current position 450 of an own vehicle, a planned driving route 451, and a spot 452 in which accident probability exceeds a threshold are displayed on a map. In addition, in addition, in the UI illustrated in FIG. 8, a message 453 is displayed that issues a warning of the presence of the spot 452 in which accident probability exceeds a threshold. In the UI illustrated in FIG. 9, the current position 450 of an own vehicle, the planned driving route 451, a spot 455 in which a large number of accidents occurred in the past, and a route 454 on which accident probability is low are displayed on a map. In addition, in the UI illustrated in FIG. 9, a message 457 and a message 456 are displayed that respectively show the presence of the spot 455 in which a large number of accidents occurred in the past and the presence of the route 454 on which accident probability is low. In this way, emphasizing and displaying information (such as a spot in which accident probability exceeds a threshold or a route on which accident probability is low) regarding accident probability on a map makes it possible to further promote safety.

(4.2) UI Regarding Factor of Increase in Accident Probability

Figure 10:
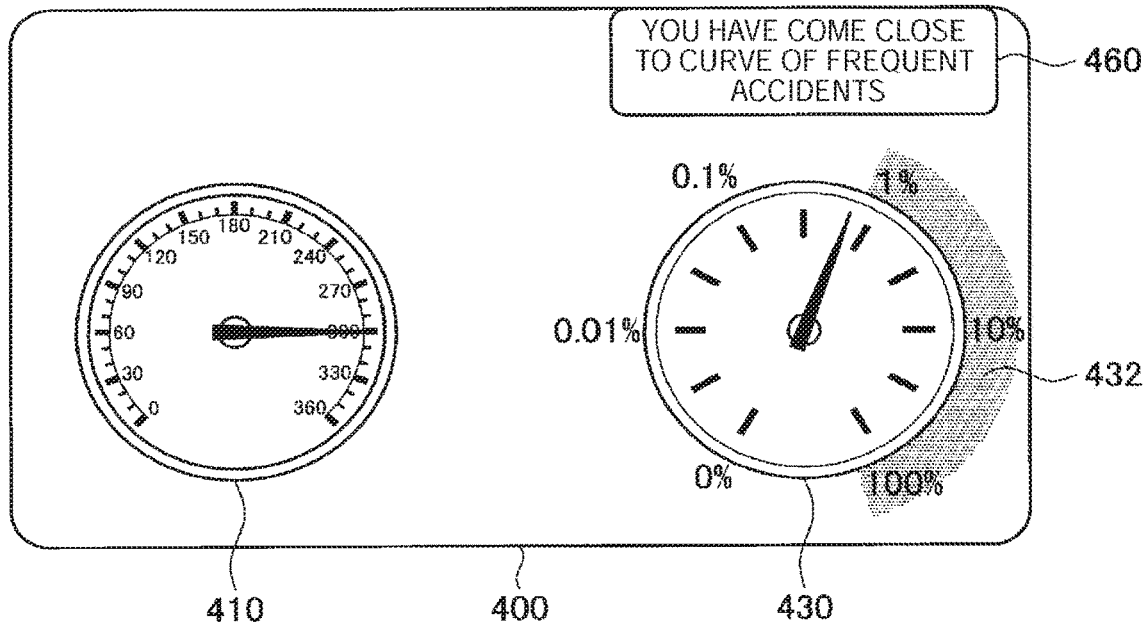
FIG. 10 is a diagram for describing a UI example according to the present embodiment.

The sensor apparatus 100 may output information corresponding to a factor that increases accident probability to a driver. For example, the sensor apparatus 100 outputs information showing the factor. This allows a driver to recognize the factor that increases accident probability and be alerted, and makes it possible to promote safety. The factor may be a feature itself, information estimated from the feature, or information estimated from the type of sensor corresponding to the feature. A plurality of factors increase accident probability in some cases. In that case, the sensor apparatus 100 may output information showing a factor selected from one or more factors in accordance with the degree of contribution to increase in accident probability. Specifically, the sensor apparatus 100 may output information showing a factor (such as a factor having the degree of contribution that exceeds a threshold or a predetermined number of factors each having the degree of contribution that is high in rank) having a high degree of contribution to increase in accident probability. For example, when accident probability is calculated with the equation (1) above, a feature itself which has a high degree of contribution to increase in accident probability, information estimated from the feature, or information estimated from the type of sensor corresponding to the feature can be output. In the case where a logistic regression model is used for prediction, the product of the value of a feature and the value of the parameter corresponding to the feature can be used as a contribution value. Such an output allows a driver to recognize a factor having an especially high increase rate and be alerted, and makes it possible to promote safety. A UI example is illustrated in FIG. 10. In the UI illustrated in FIG. 10, a message 460 is displayed that shows a factor of increase in accident probability in the UI illustrated in FIG. 5. In addition to the message, for example, an icon defined in advance for each factor may also be displayed.

Figure 11:
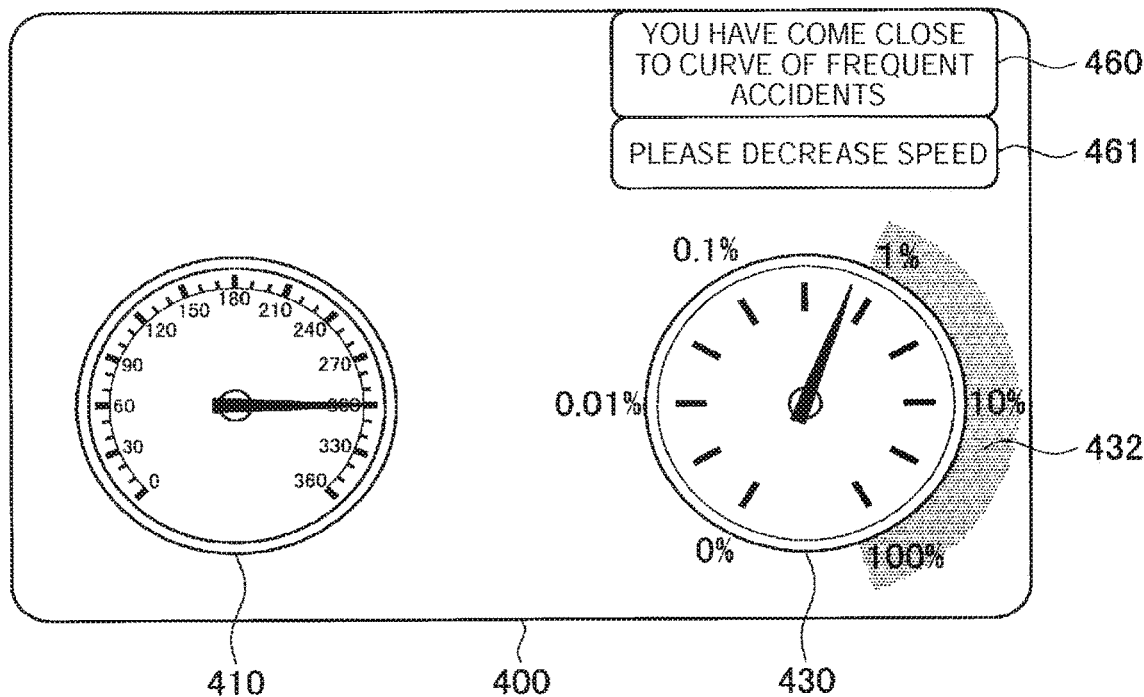
FIG. 11 is a diagram for describing a UI example according to the present embodiment.

The sensor apparatus 100 may output information that issues an instruction about an act which a driver is to carry out to decrease accident probability. Specifically, the sensor apparatus 100 outputs a message for removing the above-described factor that increases accident probability. This makes it possible to prompt a driver to carry out a specific act and promote safety. A UI example is illustrated in FIG. 11. In the UI illustrated in FIG. 11, a message 461 is displayed that issues an instruction about an act which a driver is to carry out to decrease accident probability in the UI illustrated in FIG. 10.

(4.3) Others

The sensor apparatus 100 can additionally provide a variety of UIs. One of the examples is illustrated in FIGS. 12 and 13.

Figure 12:
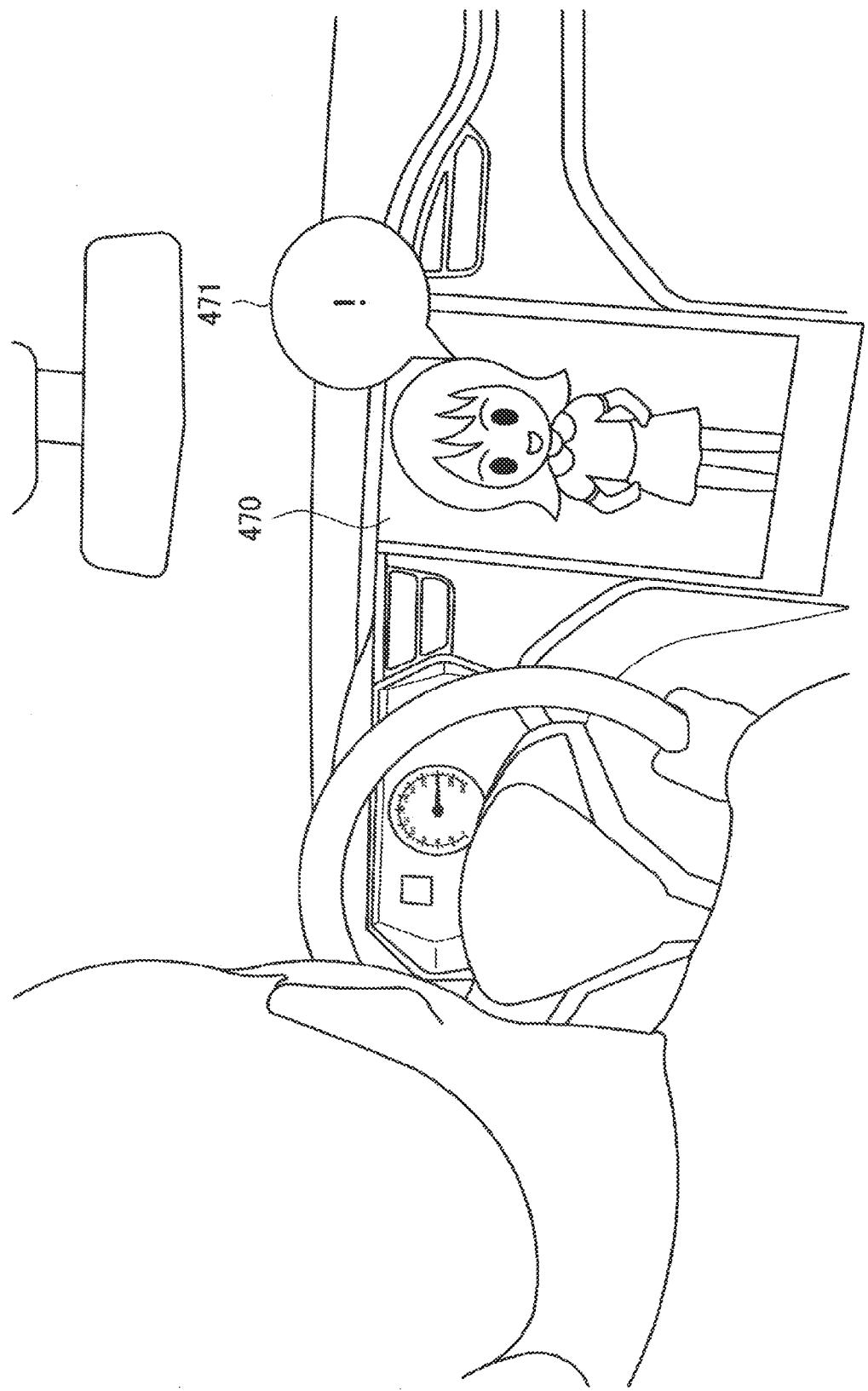
FIG. 12 is a diagram for describing a UI example according to the present embodiment.

In the UI illustrated in FIG. 12, a sound message 471 corresponding to a driving situation is fed back as if a character displayed on a display 470 gave the sound message 471. For example, the sensor apparatus 100 yields feedback that blames a driver for dangerous operations such as abrupt acceleration and hard braking that can lead to accidents, and yields feedback that praises a driver for safe driving. Such feedback allows a driver to keep in mind safe driving as if the driver played a game.

Figure 13:
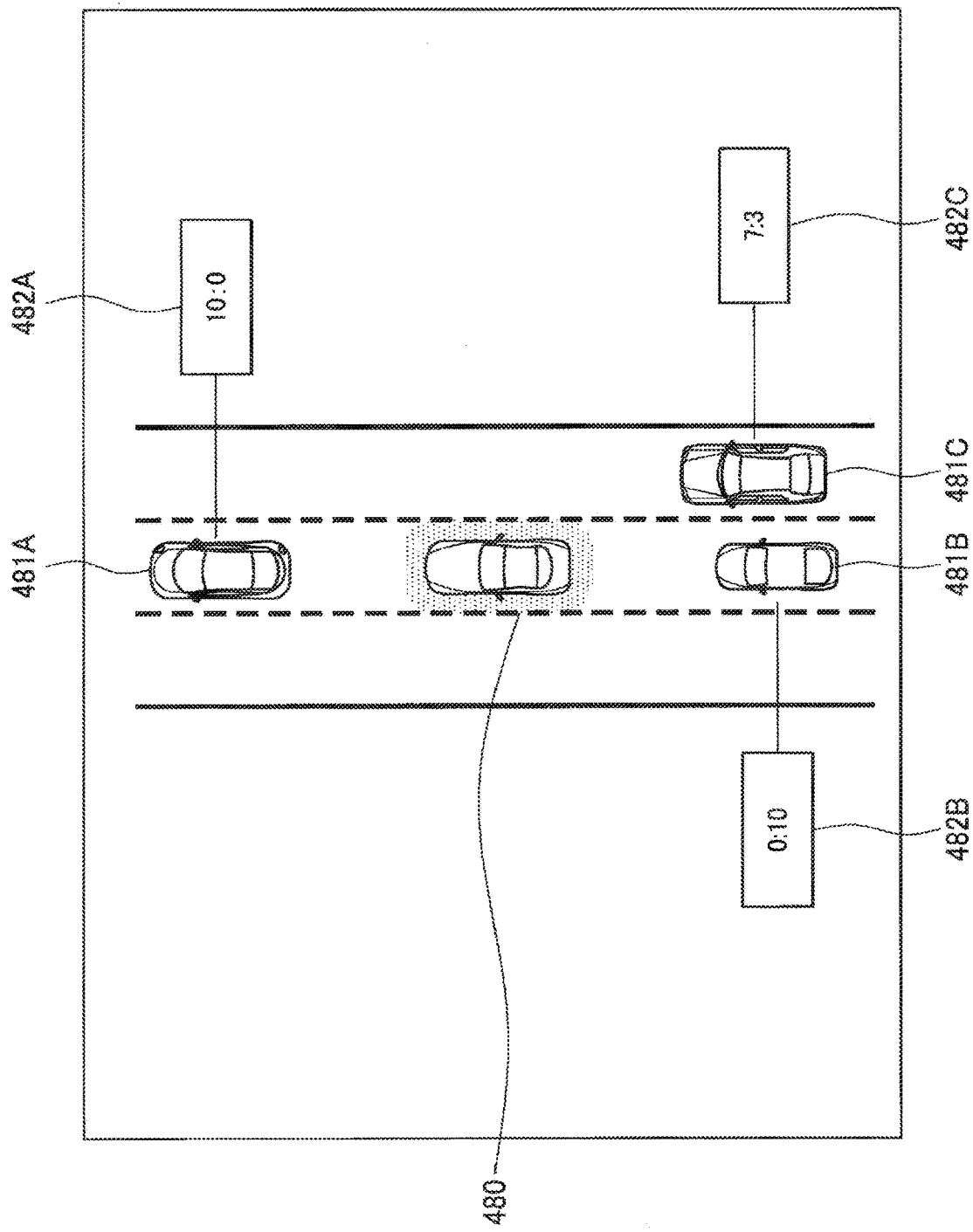
FIG. 13 is a diagram for describing a UI example according to the present embodiment.

In the UI illustrated in FIG. 13, the positional relationship between an own vehicle 480 and different vehicles 481A to 481C, and information 482A to information 482C that show negligence ratios in case accidents happen are output. For example, according to the information 482A, the negligence ratio of the own vehicle 480 to the different vehicle 481A in the case where the own vehicle 480 and the different vehicle 481A cause an accident is predicted to be 10 to 0. In addition, according to the information 482B, the negligence ratio of the own vehicle 480 to the different vehicle 481A is predicted to be 0 to 10. In addition, according to the information 482C, the negligence ratio of the own vehicle 480 to the different vehicle 481A is predicted to be 7 to 3. Such a UI allows a driver to visually grasp to which different vehicle the driver is to pay attention. Note that the UI illustrated in FIG. 13 can be displayed on a display provided to, for example, an instrument panel or a car navigation system.

4. FLOW OF PROCESSING

Next, with reference to FIGS. 14 to 18, an example of the flow of processing to be executed in the system 1 according to the present embodiment will be described.

(Prediction Model Learning Processing)

Figure 14:
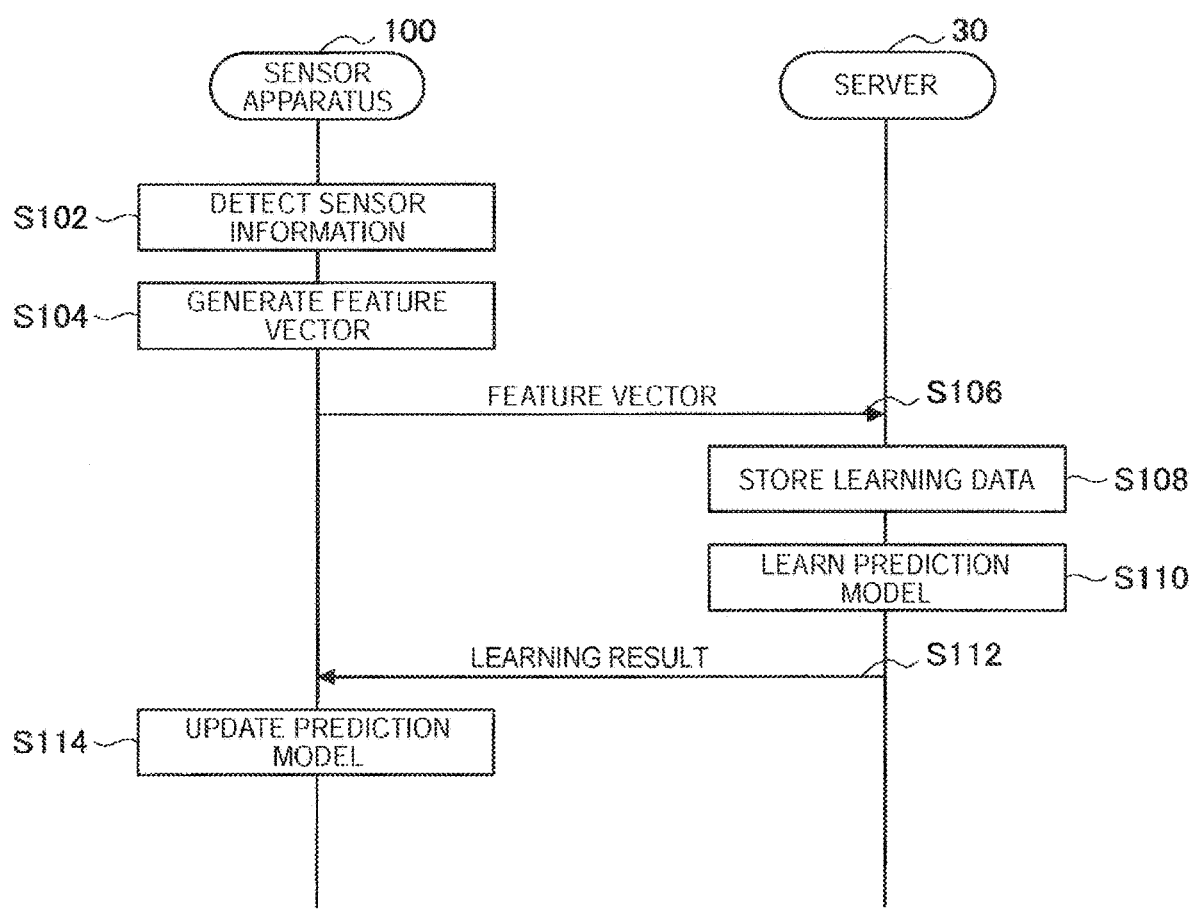
FIG. 14 is a sequence diagram illustrating an example of a flow of prediction model learning processing executed in the system according to the present embodiment.

FIG. 14 is a sequence diagram illustrating an example of the flow of prediction model learning processing executed in the system 1 according to the present embodiment. In the present sequence, the sensor apparatus 100 and the server 30 are involved.

As illustrated in FIG. 14, the sensor apparatus 100 (e.g., detection section 110) first detects sensor information (step S102). The sensor apparatus 100 (e.g., prediction section 152) then generates a feature vector on the basis of the detected sensor information (step S104). Next, the sensor apparatus 100 (e.g., communication section 120) transmits the generated feature vector to the server 30 (step S106). Although not illustrated in FIG. 14, the plurality of sensor apparatuses 100 connected to the system 1 transmit feature vectors to the server 30.

Next, the server 30 (e.g., storage control section 332 and learning data DB 320) stores, as learning data, information obtained by associating the feature vectors received from the one or more sensor apparatuses 100 with the identification information of vehicles, the presence or absence of accident occurrence, and the details of an accident (step S108). The server 30 (e.g., learning section 334) then learns a prediction model from the learning data (step S110). In the case where the prediction model is the logistic regression model shown in the equation (1), the server 30 learns the parameter w. Next, the server 30 (e.g., communication section 310) transmits information (e.g., parameter w) showing a learning result to all the sensor apparatuses 100 under the control (step S112).

The sensor apparatuses 100 (e.g., prediction section 152) then update the prediction model on the basis of the received information showing a learning result (step S114). For example, the prediction section 152 replaces the parameter of the prediction model with the received parameter.

The processing terminates here.

(Accident Probability Prediction Processing)

Figure 15:
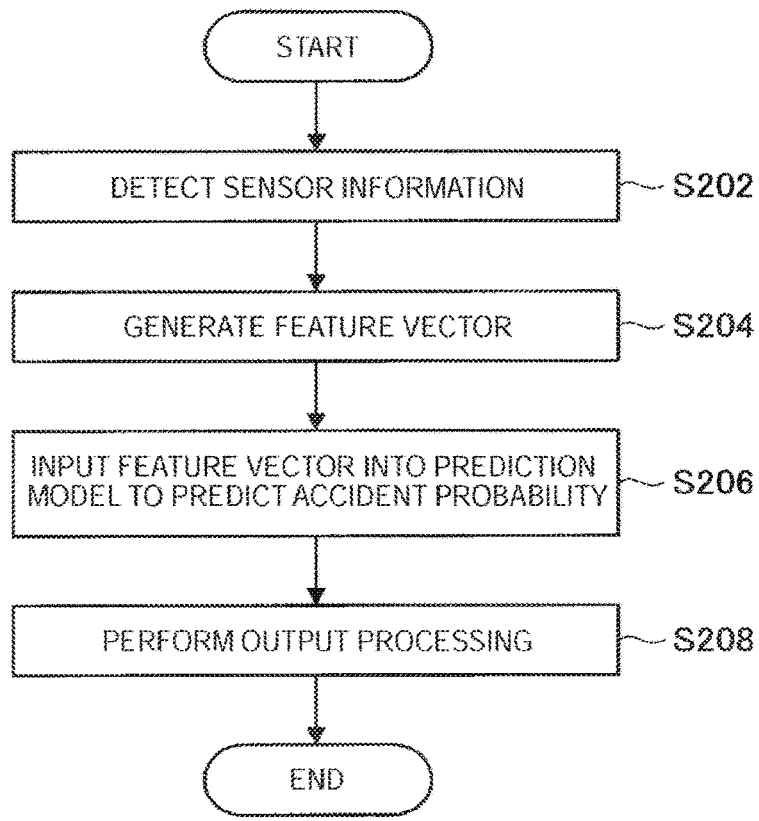
FIG. 15 is a flowchart illustrating an example of a flow of accident probability prediction processing executed in the sensor apparatus according to the present embodiment.

FIG. 15 is a flowchart illustrating an example of the flow of accident probability prediction processing executed in the sensor apparatus 100 according to the present embodiment.

As illustrated in FIG. 15, the sensor apparatus 100 (e.g., detection section 110) first detects sensor information (step S202). The sensor apparatus 100 (e.g., prediction section 152) then generates a feature vector on the basis of the detected sensor information (step S204). Note that the feature vector generated at this time may include not only a feature vector of a driver of an own vehicle or the own vehicle, but also a feature vector of a driver of a different vehicle or the different vehicle. Next, the sensor apparatus 100 (e.g., prediction section 152) inputs the feature vector into a prediction model to predict accident probability (step S206). The sensor apparatus 100 (e.g., output control section 154) then performs output processing (step S208). For example, the output control section 154 causes the output section 130 to output a UI regarding accident probability itself or a UI regarding a factor of increase in accident probability.

The processing terminates here.

(Feature Vector Generation Processing)

Figure 16:
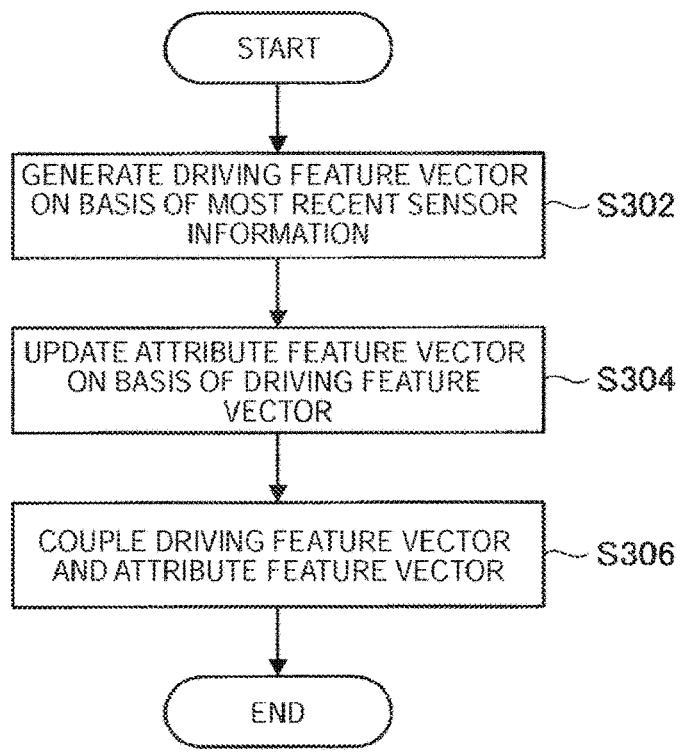
FIG. 16 is a flowchart illustrating an example of a flow of feature vector generation processing executed in the sensor apparatus according to the present embodiment.

FIG. 16 is a flowchart illustrating an example of the flow of feature vector generation processing executed in the sensor apparatus 100 according to the present embodiment. The present flow corresponds to the processing in step S104 and step S204 above.

As illustrated in FIG. 16, the sensor apparatus 100 (e.g., prediction section 152) first generates a driving feature vector on the basis of the most recent sensor information (step S302). The sensor apparatus 100 (e.g., prediction section 152) then updates an attribute feature vector on the basis of the driving feature vector (step S304). The sensor apparatus 100 (e.g., prediction section 152) then couples the driving feature vector and the attribute feature vector (step S306).

The processing terminates here.

Next, as an example of generation processing of individual feature vectors, generation processing of a feature vector regarding accident information associated with a map and generation processing of a feature vector regarding the probability of the occurrence of a precursory phenomenon will be described.

Figure 17:
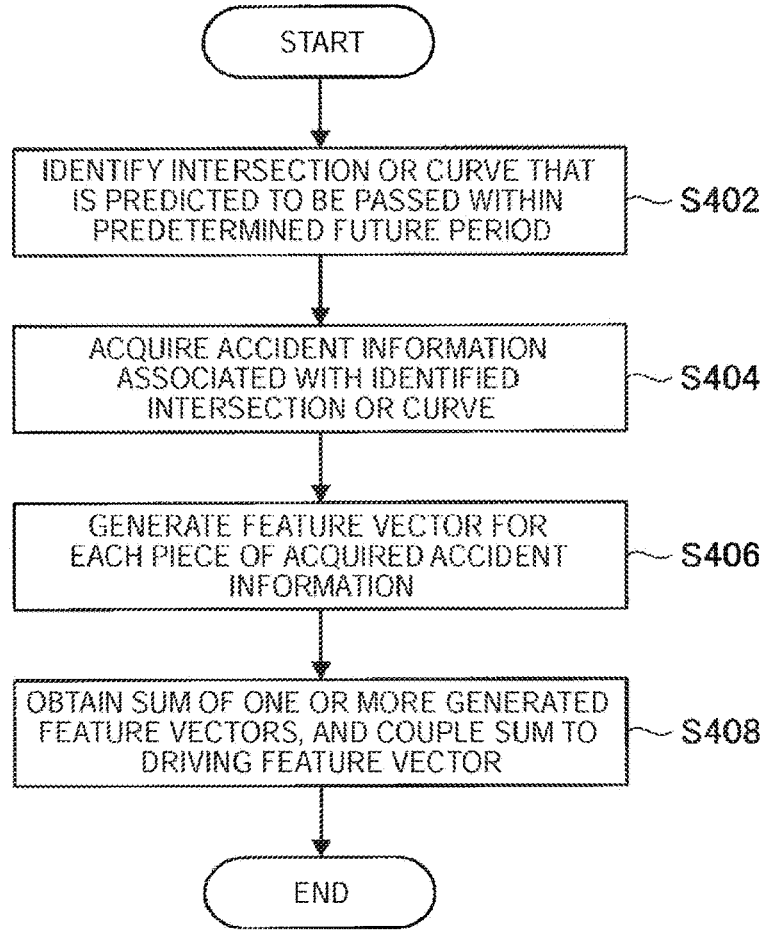
FIG. 17 is a flowchart illustrating an example of a flow of feature vector generation processing that is executed in the sensor apparatus according to the present embodiment and pertains to accident information associated with a map.

FIG. 17 is a flowchart illustrating an example of the flow of feature vector generation processing that is executed in the sensor apparatus 100 according to the present embodiment and pertains to accident information associated with a map.

As illustrated in FIG. 17, the sensor apparatus 100 (e.g., prediction section 152) first identifies an intersection or a curve that is predicted to be passed within a predetermined future period (step S402). The sensor apparatus 100 (e.g., prediction section 152) then acquires accident information associated with the identified intersection or curve from the server 30 (step S404). The sensor apparatus 100 (e.g., prediction section 152) then generates a feature vector for each of the pieces of acquired accident information (step S406). The sensor apparatus 100 (e.g., prediction section 152) then obtains the sum of the one or more feature vectors, and couples the sum to a driving feature vector (step S408).

The processing terminates here.

Figure 18:
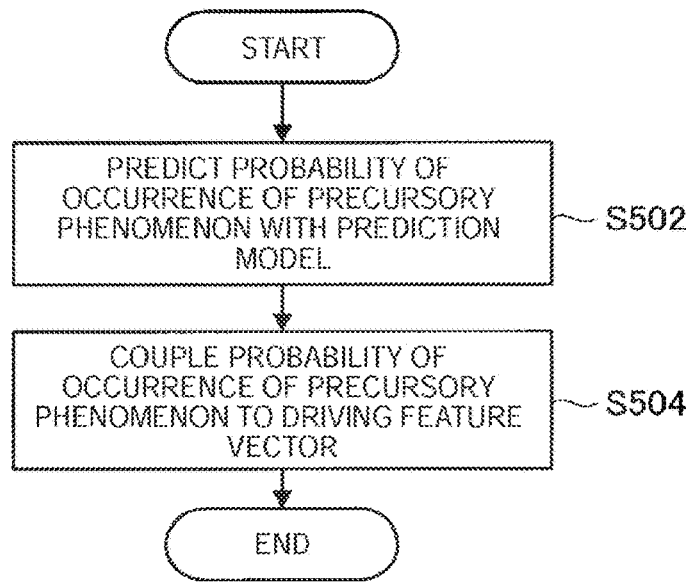
FIG. 18 is a flowchart illustrating an example of a flow of feature vector generation processing that is executed in the sensor apparatus according to the present embodiment and pertains to probability of occurrence of a precursory phenomenon.

FIG. 18 is a flowchart illustrating an example of the flow of feature vector generation processing that is executed in the sensor apparatus 100 according to the present embodiment and pertains to probability of occurrence of a precursory phenomenon.

As illustrated in FIG. 18, the sensor apparatus 100 (e.g., prediction section 152) first predicts the probability of the occurrence of a precursory phenomenon with a prediction model (step S502). This prediction model is a prediction model of the probability of the occurrence of a precursory phenomenon. Next, the sensor apparatus 100 (prediction section 152) couples the probability of the occurrence of a precursory phenomenon to a driving feature vector (step S504).

The processing terminates here.

5. HARDWARE CONFIGURATION EXAMPLE

The technology of the present disclosure is applicable to various products. For example, the sensor apparatus 100 may be implemented as an apparatus mounted on any type of vehicle such as an automobile, an electric vehicle, a hybrid electric vehicle, or a motorcycle. In addition, at least some components of the sensor apparatus 100 may be implemented in a module (e.g., integrated circuit module including one die) for an apparatus mounted on a vehicle.

5.1. Configuration Example of Vehicle Control System

Figure 19:
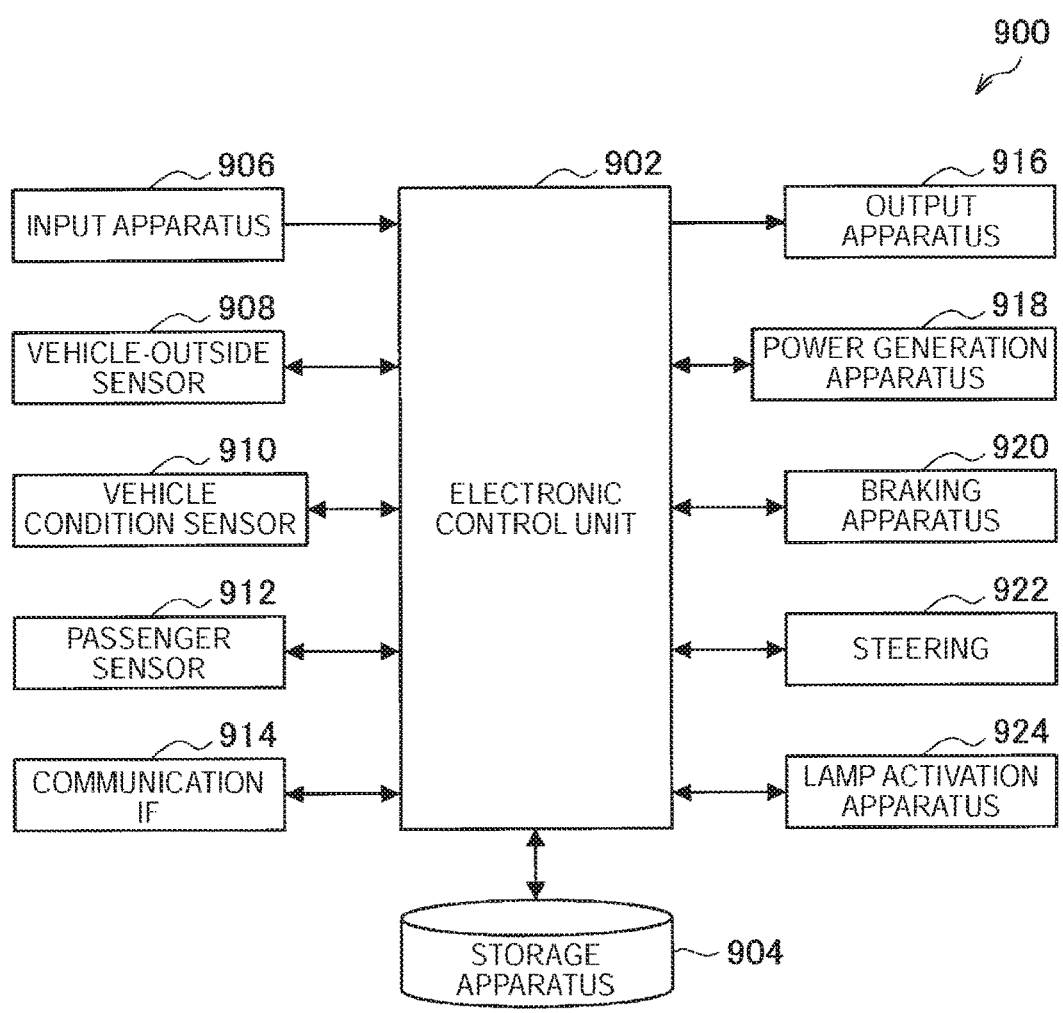
FIG. 19 is a block diagram illustrating an example of a schematic configuration of a vehicle system.

FIG. 19 is a block diagram illustrating an example of a schematic configuration of a vehicle control system 900 to which the technology of the present disclosure may be applied. The vehicle control system 900 includes an electronic control unit 902, a storage apparatus 904, an input apparatus 906, a vehicle-outside sensor 908, a vehicle condition sensor 910, a passenger sensor 912, a communication IF 914, an output apparatus 916, a power generation apparatus 918, a braking apparatus 920, a steering 922, and a lamp activation apparatus 924.

The electronic control unit 902 functions as an operation processing apparatus and a control apparatus, and controls the overall operation of the vehicle control system 900 in accordance with a variety of programs. The electronic control unit 902 can be configured as an electronic control unit (ECU) along with the storage apparatus 904 described below. A plurality of ECUs (i.e., electronic control unit 902 and storage apparatus 904) may be included in the vehicle control system 900. For example, ECUs for controlling each of various sensors or various drive systems may be provided thereto, and an ECU for controlling the plurality of those ECUs in cooperative manner may be further provided. The plurality of these ECUs are connected via an in-vehicle communication network such as a controller area network (CAN), a local interconnect network (LIN), a local area network (LAN), or Flexray that is compliant with any standard. The electronic control unit 902 can be included, for example, in the control section 150 illustrated in FIG. 2.

The storage apparatus 904 is an apparatus for data storage which is configured as an example of a storage section of the vehicle control system 900. The storage apparatus 904 is implemented, for example, as a magnetic storage device such as a HDD, a semiconductor storage device, an optical storage device, a magneto-optical storage device, or the like. The storage apparatus 904 may include a recording medium, a recording apparatus that records data in the recording medium, a readout apparatus that reads out data from the recording medium, and a deletion apparatus that deletes data recoded in the recording medium. The storage apparatus 904 stores a program to be executed by the electronic control unit 902, various types of data, various types of data acquired from the outside, and the like. The storage apparatus 904 can be included, for example, in the storage section 140 illustrated in FIG. 2.

The input apparatus 906 is implemented by an apparatus such as a mouse, a keyboard, a touch panel, a button, a microphone, a switch, and a lever into which a passenger (driver or occupant) inputs information. In addition, the input apparatus 906 may be, for example, a remote control apparatus using infrared light or other radio waves, or may be an external connection device such as a mobile phone or a PDA corresponding to the operation of the vehicle control system 900. In addition, the input apparatus 906 may be, for example, a camera. In that case, a passenger can input information according to gesture. Further, the input apparatus 906 may include an input control circuit or the like that generates an input signal, for example, on the basis of information input by a user using the above-described input means, and outputs the generated input signal to the electronic control unit 902. The passenger is able to input various kinds of data to the vehicle control system 900 or instruct the vehicle control system 900 about a processing operation by operating this input apparatus 906. The input apparatus 906 can be included, for example, in the detection section 110 illustrated in FIG. 2.

The vehicle-outside sensor 908 is implemented by a sensor that detects information of the outside of the vehicle. For example, the vehicle-outside sensor 908 may include a sonar apparatus, a radar apparatus, a light detection and ranging or laser imaging detection and ranging (LIDAR) apparatus, a camera, a stereo-camera, a time of flight (ToF) camera, an infrared sensor, an environment sensor, a microphone, or the like. The vehicle-outside sensor 908 can be included, for example, in the detection section 110 illustrated in FIG. 2.

The vehicle condition sensor 910 is implemented by a sensor that detects information regarding the vehicle condition. For example, the vehicle condition sensor 910 may include a sensor that detects an operation performed by a driver such as an accelerator opening degree, brake stepping force, or a steering wheel angle. In addition, the vehicle condition sensor 910 may include a sensor that detects the condition of a power source such as the rotation speed or torque of an internal combustion engine or a motor. In addition, the vehicle condition sensor 910 may include a sensor such as a gyro sensor or an acceleration sensor for detecting information regarding the movement of the vehicle. In addition, the vehicle condition sensor 910 may include a global navigation satellite system (GNSS) module that receives GNSS signals (e.g., global positioning system (GPS) signals from a GPS satellite) from a GNSS satellite, and measures position information including the latitude, longitude, and altitude of the apparatus. Note that, with respect to the position information, the vehicle condition sensor 910 may detect the position through Wi-Fi (registered trademark), transmission and reception to and from a mobile phone/PHS/smartphone or the like, near field communication, or the like. The vehicle condition sensor 910 can be included, for example, in the detection section 110 illustrated in FIG. 2.

The passenger sensor 912 can be implemented by a sensor that detects information regarding a passenger. For example, the passenger sensor 912 may include a camera, a microphone, and an environment sensor provided to a vehicle compartment. In addition, the passenger sensor 912 may include a biological sensor that detects biological information of a passenger. The biological sensor is attached, for example, to a seating face, the steering wheel, or the like, and is capable of detecting biological information of the passenger sitting on the seat or the driver gripping the steering. The passenger sensor 912 can be included, for example, in the detection section 110 illustrated in FIG. 2.

Note that various sensors such as the vehicle-outside sensor 908, the vehicle condition sensor 910, and the passenger sensor 912 each output information showing a detection result to the electronic control unit 902. These various sensors may set the sensing area, accuracy, or the like on the basis of the control of the electronic control unit 902. In addition, these various sensors may include a recognition module that performs recognition processing based on raw data such as processing of recognizing the driving position of an own vehicle on a road, for example, on the basis of the position of a lane line included in a taken captured image.

The communication IF 914 is a communication interface that mediates communication performed by the vehicle control system 900 with another apparatus. The communication IF 914 can include, for example, a V2X communication module. Note that V2X communication is a concept including vehicle-to-vehicle communication and vehicle-to-infrastructure communication. Additionally, the communication IF 914 may also include a communication module for a wireless local area network (LAN), Wi-Fi (registered trademark), 3G, long term evolution (LTE), Bluetooth (registered trademark), near field communication (NFC) or wireless USB (WUSB). This communication IF 914 is capable of transmitting and receiving signals or the like, for example, to and from the Internet or other communication devices outside the vehicle in compliance with a predetermined protocol such as TCP/IP. The communication IF 914 can be included, for example, in the communication section 120 illustrated in FIG. 2.

The output apparatus 916 is implemented as an apparatus capable of visually or aurally notifying a passenger of acquired information. Such an apparatus includes a display apparatus such as an instrument panel, a head-up display, a projector or a lamp, and a sound output apparatus such as a speaker or headphones. Specifically, the display apparatus visually displays results obtained from various kinds of processing performed by the vehicle control system 900 in a variety of forms such as text, an image, a table, and a graph. At that time, a virtual object such as an augmented reality (AR) object may be displayed. Meanwhile, the audio output apparatus converts audio signals including reproduced audio data, acoustic data, or the like into analog signals, and aurally outputs the analog signals. The above-described display apparatus and the above-described sound output apparatus can be included, for example, in the output section 130 illustrated in FIG. 2.

The power generation apparatus 918 is an apparatus for generating driving force for the vehicle. The power generation apparatus 918 may be implemented, for example, as an internal combustion engine. In that case, the power generation apparatus 918 performs start control, stop control, throttle valve opening degree control, fuel injection control, exhaust gas recirculation (EGR) control, or the like on the basis of a control command from an electronic control unit 902. In addition, the power generation apparatus 918 may be implemented, for example, as a motor, an inverter, and a battery. In that case, the power generation apparatus 918 can supply electric power from the battery to the motor via the inverter on the basis of a control command from the electronic control unit 902, and perform a motor operation (so-called powering) to output positive torque and a regenerative operation to cause the motor to absorb torque to generate electric power, and charge the battery.

The braking apparatus 920 is an apparatus for providing braking force to the vehicle, or causing the vehicle to decelerate or stop. The braking apparatus 920 can include, for example, a brake installed at each wheel, and a brake pipe for transmitting the force of stepping on the brake pedal to the brake, an electronic circuit or the like. In addition, the braking apparatus 920 may include a control apparatus such as an antilock brake system (ABS) or an electronic stability control (ESC) for activating a mechanism of preventing a slide or a skid caused by brake control.

The steering 922 is an apparatus for controlling the advancing direction (steering angle) of the vehicle. The steering 922 can include, for example, a steering wheel, a steering shaft, a steering gear, a tie rod, and the like. In addition, the steering 922 can include a power steering for assisting a driver in steering. Further, the steering 922 can include a power source such as a motor for allowing for automatic steering.

The lamp activation apparatus 924 is an apparatus that activates various lamps such as a head light, a blinker, a position lamp, a fog light, or a stop lamp. The lamp activation apparatus 924 controls, for example, the blinking of the lamps, the amount of light, the light-emitting direction, or the like.

Note that the power generation apparatus 918, the braking apparatus 920, the steering 922, and the lamp activation apparatus 924 may come into operation on the basis of a manual operation performed by a driver or on the basis of an automatic operation performed by the electronic control unit 902.

5.2. Configuration Example of Information Processing Apparatus

Figure 20:
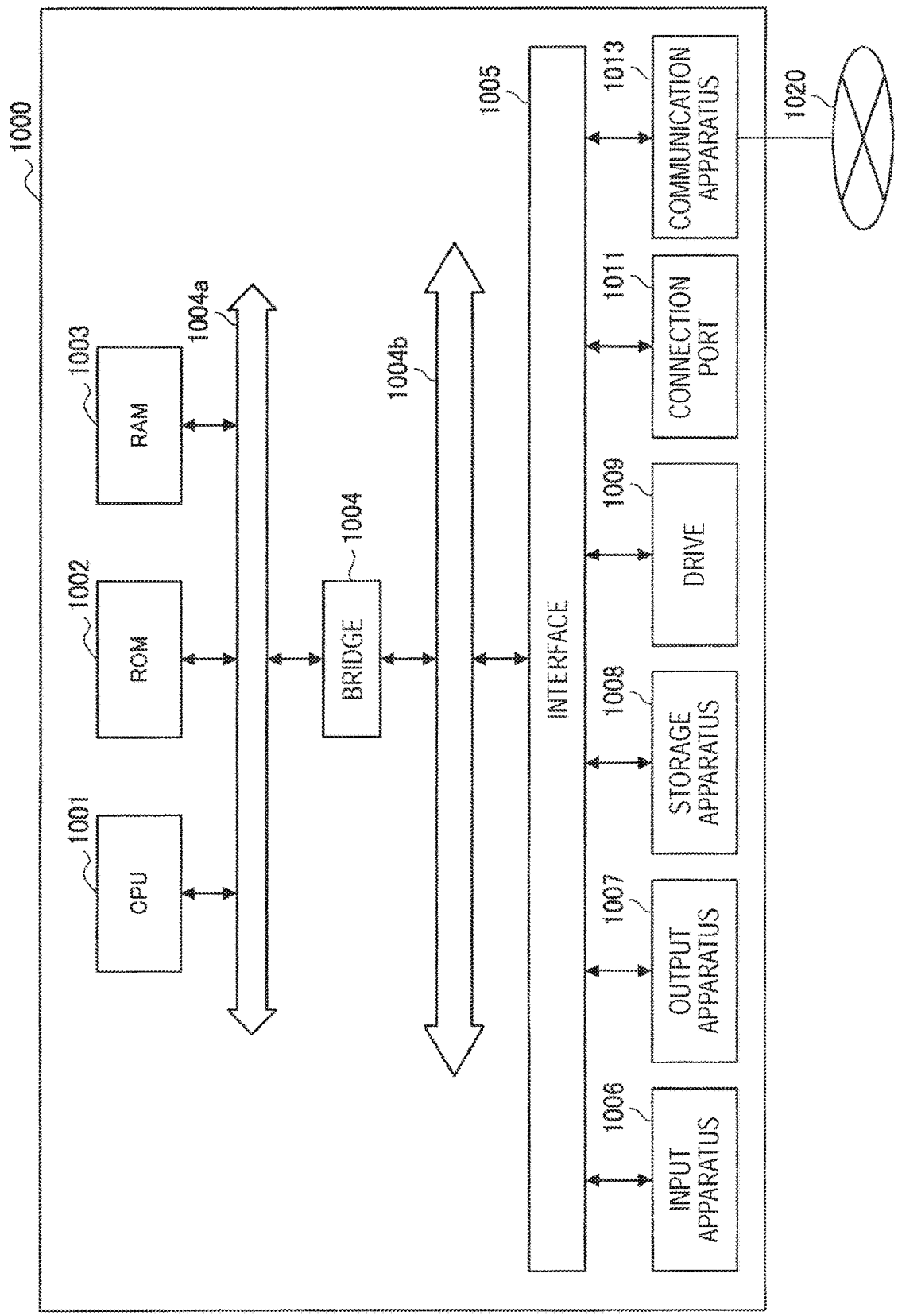
FIG. 20 is a block diagram illustrating an example of a hardware configuration of an information processing apparatus.

FIG. 20 is a block diagram illustrating an example of a hardware configuration of an information processing apparatus according to the present embodiment. Note that an information processing apparatus 1000 illustrated in FIG. 20 can implement, for example, the server 30 illustrated in FIG. 3. Information processing performed by the server 30 according to the present embodiment is implemented by software in cooperation with hardware described below.

As illustrated in FIG. 20, the information processing apparatus 1000 includes a central processing unit (CPU) 1001, a read only memory (ROM) 1002, a random access memory (RAM) 1003, and a host bus 1004a. In addition, the information processing apparatus 1000 includes a bridge 1004, an external bus 1004b, an interface 1005, an input apparatus 1006, an output apparatus 1007, a storage apparatus 1008, a drive 1009, a connection port 1011, and a communication apparatus 1013. The information processing apparatus 1000 may include a processing circuit such as a DSP or an ASIC instead of or in combination with the CPU 1001.

The CPU 1001 functions as an operation processing apparatus and a control apparatus, and controls the overall operation of the information processing apparatus 1000 in accordance with a variety of programs. In addition, the CPU 1001 may be a microprocessor. The ROM 1002 stores programs, operation parameters, and the like that the CPU 1001 uses. The RAM 1003 temporarily stores programs used in the execution of the CPU 1001 and the parameters and the like that appropriately changes during the execution. The CPU 1001 can be included, for example, in the control section 330 illustrated in FIG. 3.

The CPU 1001, the ROM 1002, and the RAM 1003 are connected to each other by the host bus 1004a including a CPU bus and the like. The host bus 1004a is connected to the external bus 1004b such as a peripheral component interconnect/interface (PCI) bus through the bridge 1004. Note that the host bus 1004a, the bridge 1004, and the external bus 1004b are not necessarily configured as different components, but the functions thereof may be implemented in one bus.

The input apparatus 1006 is implemented by an apparatus with which a user inputs information, such as a mouse, a keyboard, a touch panel, a button, a microphone, a switch, and a lever. In addition, the input apparatus 1006 may be, for example, a remote control apparatus using infrared light or other radio waves, or may be an external connection device such as a mobile phone or a PDA corresponding to the operation of the information processing apparatus 1000. Further, the input apparatus 1006 may include, for example, an input control circuit or the like that generates an input signal on the basis of information input by a user using the above-described input means, and outputs the input signal to the CPU 1001. A user of the information processing apparatus 1000 is able to input various kinds of data to the information processing apparatus 1000 and instruct the information processing apparatus 1000 about a processing operation by operating this input apparatus 1006.

The output apparatus 1007 includes an apparatus capable of visually or aurally notifying a user of acquired information. Such an apparatus includes a display apparatus such as a CRT display apparatus, a liquid crystal display apparatus, a plasma display apparatus, an EL display apparatus, a laser projector, an LED projector and a lamp, an audio output apparatus such as a speaker and a headphone, a printer apparatus, or the like. The output apparatus 1007 outputs, for example, results obtained from various kinds of processing performed by the information processing apparatus 1000. Specifically, the display apparatus visually displays results obtained from various kinds of processing performed by the information processing apparatus 1000 in a variety of forms such as text, an image, a table, and a graph. Meanwhile, the audio output apparatus converts audio signals including reproduced audio data, acoustic data, or the like into analog signals, and aurally outputs the analog signals.

The storage apparatus 1008 is an apparatus for data storage which is configured as an example of a storage section of the information processing apparatus 1000. The storage apparatus 1008 is implemented, for example, as a magnetic storage device such as a HDD, a semiconductor storage device, an optical storage device, a magneto-optical storage device, or the like. The storage apparatus 1008 may include a recording medium, a recording apparatus that records data in the recording medium, a readout apparatus that reads out data from the recording medium, and a deletion apparatus that deletes data recoded in the recording medium. The storage apparatus 1008 stores a program to be executed by the CPU 1001, various kinds of data, various kinds of data acquired from the outside, and the like. The storage apparatus 1008 can be included, for example, in the learning data DB 320 illustrated in FIG. 3.

The drive 1009 is a reader/writer for a storage medium, and is built in or externally attached to the information processing apparatus 1000. The drive 1009 reads out information recorded on a removable storage medium such as a mounted magnetic disk, an optical disc, a magneto-optical disk, and semiconductor memory, and outputs the read-out information to the RAM 1003. In addition, the drive 1009 is also capable of writing information into a removable storage medium.

The connection port 1011 is an interface connected to an external device and is a port for connecting an external device that is capable of data transmission through, for example, a universal serial bus (USB).

The communication apparatus 1013 is, for example, a communication interface including a communication device and the like for a connection to a network 1020. The communication apparatus 1013 may be, for example, a communication card for a wired or wireless local area network (LAN), Long Term Evolution (LTE), Bluetooth (registered trademark), a wireless USB (WUSB), or the like. In addition, the communication apparatus 1013 may be a router for optical communication, a router for an asymmetric digital subscriber line (ADSL), a modem for various kinds of communication, or the like. This communication apparatus 1013 is capable of transmitting and receiving signals or the like, for example, to and from the Internet or other communication devices in compliance with a predetermined protocol such as TCP/IP. The communication apparatus 1013 can be included, for example, in the communication section 310 illustrated in FIG. 3.

Note that the network 1020 is a wired or wireless transmission path through which information is transmitted from an apparatus connected to the network 1020. The network 1020 may include public networks such as the Internet, telephone networks and satellite networks, a variety of local area networks (LANs) including Ethernet (registered trademark), and wide area networks (WANs). In addition, the network 1020 may also include leased line networks such as Internet protocol-virtual private networks (IP-VPNs).

5.3. Supplemental Information

The example of a hardware configuration capable of implementing the functions of the sensor apparatus 100 or the server 30 according to the present embodiment has been described above. Each of the above-described components may be configured with a general-purpose member, and may also be configured with hardware specialized in the function of each component. Thus, the hardware configuration used can be modified as appropriate in accordance with the technological level at the time of the implementation of the present embodiment.

Note that it is possible to create a computer program for implementing the respective functions of the sensor apparatus 100 or the server 30 according to the above-described embodiment, and to implement the computer program in an ECU or the like. In addition, there can also be provided a computer-readable recording medium having such a computer program stored therein. Examples of the recording medium include a magnetic disk, an optical disc, a magneto-optical disk, a flash memory, and the like. In addition, the computer program may also be distributed via a network, for example, using no recording medium.

6. CONCLUSION

An embodiment of the present disclosure has been described above in detail with reference to FIGS. 1 to 19. As described above, the sensor apparatus 100 according to the present embodiment predicts the accident probability of a vehicle driven by a user, and outputs, to the user, information corresponding to a factor that increases the predicted accident probability. This clearly presents what accident avoidance act is to be specifically carried out in the case where accident probability is high. Accordingly, it is possible for the user to easily carry out an accident avoidance act, and it is possible to promote safety.

In addition, the sensor apparatus 100 according to the present embodiment uses a variety of feature vectors that can influence the occurrence of an accident to predict accident probability. For example, the sensor apparatus 100 uses a variety of feature vectors such as forgetting to turn on the blinkers (vehicle operation information), decreasing in concentration (biological condition information), being in bad shape (biological information), fogged windows (vehicle compartment environment information), rain or night (weather information), not looking around (driver physical condition information), turning the steering wheel with one hand (driver physical condition information), an intersection where accidents are likely to happen (accident information associated with a map), rough driving (driver's habit information), and a harsh car being ahead of the intersection (driving proficiency level information or accident probability of a different vehicle in the vicinity) that can influence the occurrence of an accident to predict accident probability. This makes it possible to improve accuracy in predicting accident probability.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-described embodiment, an example has been chiefly described in which the sensor apparatus 100 is mounted on a vehicle, but the present technology is not limited to the example. For example, the sensor apparatus 100 is mountable on any mobile object such as an aircraft, a bicycle, or a motorcycle. In addition, the sensor apparatus 100 may be implemented as a user device such as a smartphone or a head-mounted display (HMD). In addition, the sensor apparatus 100 may be implemented as an apparatus such as a traffic light, a surveillance camera, a digital signage, or an electronic message board that is installed in an environment. In that case, the sensor apparatus 100 outputs information to the driver of a vehicle that travels, for example, in the nearby area.

In addition, each of the apparatuses described herein may be implemented as a single apparatus, or part or the whole thereof may be implemented different apparatuses. For example, in the functional component example of the sensor apparatus 100 illustrated in FIG. 2, the storage section 140 and the control section 150 may be included in an apparatus such as a server that is connected to the detection section 110, the communication section 120, and the output section 130 via a network or the like.

In addition, the processing described herein with reference to the flowcharts and the sequence diagrams does not necessarily have to be executed in the illustrated order. Some processing steps may be executed in parallel. In addition, additional processing steps may also be adopted, while some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:
    a prediction section configured to predict accident probability of a vehicle driven by a user; and
    an output control section configured to cause information to be output to the user, the information corresponding to a factor that increases the accident probability predicted by the prediction section.

(2)

The information processing apparatus according to (1), in which
    the output control section causes information to be output, the information showing the factor.

(3)

The information processing apparatus according to (2), in which
    the output control section causes the information to be output, the information showing the factor selected from the one or more factors in accordance with a degree of contribution to increase in the accident probability.

(4)

The information processing apparatus according to any one of (1) to (3), in which
    the output control section causes information to be output, the information issuing an instruction about an act that the user is to carry out to decrease the accident probability.

(5)

The information processing apparatus according to any one of (1) to (4), in which
    the output control section causes information to be output, the information showing the accident probability.

(6)

The information processing apparatus according to (5), in which
    the output control section causes the accident probability to be output on a logarithmic scale.

(7)

The information processing apparatus according to (5) or (6), in which
    the output control section causes information to be output, the information showing a chronological transition of the accident probability.

(8)

The information processing apparatus according to any one of (5) to (7), in which
    the output control section causes information to be output, the information being based on a cumulative value of the accident probability.

(9)

The information processing apparatus according to any one of (5) to (8), in which
    the output control section causes information regarding the accident probability to be output onto a map.

(10)

The information processing apparatus according to any one of (1) to (9), in which
    the prediction section uses a prediction model to predict the accident probability, the prediction model being learned by taking probability of occurrence of a precursory phenomenon of an accident into consideration.

(11)

The information processing apparatus according to (10), in which
    the precursory phenomenon is hard braking or abrupt steering.

(12)

The information processing apparatus according to any one of (1) to (11), in which
    the prediction section predicts the accident probability on a basis of a feature regarding the user or the vehicle.

(13)

The information processing apparatus according to (12), in which
    the feature is information detected in real time.

(14)

The information processing apparatus according to (12), in which
    the feature is accumulated or registered information.

(15)

The information processing apparatus according to any one of (12) to (14), in which
    the prediction section predicts the accident probability on a basis of a feature regarding another vehicle.

(16)

An information processing method including:
    predicting accident probability of a vehicle driven by a user; and
    causing an output apparatus to output information to the user, the information corresponding to a factor that increases the predicted accident probability.

(17)

A program for causing a computer to function as:
    a prediction section configured to predict accident probability of a vehicle driven by a user; and
    an output control section configured to cause information to be output to the user, the information corresponding to a factor that increases the accident probability predicted by the prediction section.

REFERENCE SIGNS LIST 1 system
100 sensor apparatus
110 detection section
120 communication section
130 output section
140 storage section
150 control section
152 prediction section
154 output control section
30 server
310 communication section
320 learning data DB
330 control section
332 storage control section
334 learning section 40 external DB

The invention claimed is:

1. An information processing apparatus comprising:
   processing circuitry configured predict accident probability of a vehicle driven by a user by using a prediction model, and
   the processing circuitry is further configured to cause information to be output to the user, the information indicating a value of the predicted accident probability, and the information further including a factor that increases the accident probability,
   wherein the prediction model is created by performing learning in a server based on a database storing feature data including at least accident information associated with a map, operation information of the vehicle, and weather information, and
   the processing circuitry is further configured to output a sound message that assigns responsibility to the user for a dangerous driving operation performed by the user and indicates approval of the user for a safe driving operation performed by the user.

2. The information processing apparatus according to claim 1, wherein the database includes the feature data received from more than one vehicle.

3. The information processing apparatus according to claim 1, wherein the processing circuitry is further configured to predict the accident probability of the vehicle personalized for a driver of the vehicle or the vehicle.

4. The information processing apparatus according to claim 1, wherein the database further stores occurrence of a precursory phenomenon of an accident.

5. The information processing apparatus according to claim 1, wherein the database further stores movement information of the vehicle.

6. The information processing apparatus according to claim 1, wherein the database further stores driving route information.

7. The information processing apparatus according to claim 1, wherein the database further stores driving history information.

8. The information processing apparatus according to claim 4, wherein the processing circuitry is further configured to predict occurrence probability of a precursory phenomenon of an accident.

9. The information processing apparatus according to claim 1, wherein the information is a notification or a warning to the user.

10. The information processing apparatus according to claim 9, wherein the processing circuitry causes the outputting of the notification or the warning when the accident probability exceeds a threshold.

11. A computer-readable storage medium storing computer instructions, which when executed by a computer, cause the computer to perform information processing steps comprising:
    predicting accident probability of a vehicle driven by a user by using a prediction model;
    causing information to be output to the user, the information indicating a value of the accident probability predicted by the predicting, and the information further including a factor that increases the accident probability;
    creating the prediction model by performing learning in a server based on a database storing feature data including at least accident information associated with a map, operation information of the vehicle, and weather information; and
    outputting a sound message that assigns responsibility to the user for a dangerous driving operation performed by the user and indicates approval of the user for a safe driving operation performed by the user.

12. The computer-readable storage medium according to claim 11, wherein the database includes the feature data received from more than one vehicle.

13. The computer-readable storage medium according to claim 11, wherein the predicting predicts the accident probability of the vehicle personalized for a driver of the vehicle or the vehicle.

14. The computer-readable storage medium according to claim 11, wherein the database further stores occurrence of a precursory phenomenon of an accident.

15. The computer-readable storage medium according to claim 11, wherein the database further stores movement information of the vehicle.

16. The computer-readable storage medium according to claim 11, wherein the database further stores driving route information.

17. The computer-readable storage medium according to claim 11, wherein the database further stores driving history information.

18. The computer-readable storage medium according to claim 17, wherein the predicting predicts occurrence probability of a precursory phenomenon of an accident.

19. The computer-readable storage medium according to claim 11, wherein the information is a notification or a warning to the user.

20. The computer-readable storage medium according to claim 19, wherein the causing the information to be output to the user includes outputting of the notification or the warning when the accident probability exceeds a threshold.

21. An information processing method comprising:
    predicting accident probability of a vehicle driven by a user by using a prediction model;
    causing information to be output to the user, the information indicating a value of the accident probability predicted by the predicting, and the information further including a factor that increases the accident probability;
    creating the prediction model by performing learning in a server based on a database storing feature data including at least accident information associated with a map, operation information of the vehicle, and weather information; and
    outputting a sound message that assigns responsibility to the user for a dangerous driving operation performed by the user and indicates approval of the user for a safe driving operation performed by the user.

22. The information processing apparatus according to claim 1, wherein:
    the processing circuitry is further configured to identify a plurality of factors that increase the accident probability based on a degree of contribution to an increase in accident probability for each factor; and
    the processing circuitry is further configured to select one of the plurality of factors that increases the accident probability by comparing the degree of contribution for each factor to a threshold value; and
    the processing circuitry
    outputs to the user the information that further includes the selected one of the plurality of factors as the factor that increases the accident probability.

23. The information processing apparatus according to claim 1, wherein the information includes a textual description of the factor that increases the accident probability, an instruction about an act that the user is to carry out to decrease the accident probability, and an icon defined in advance for each of a plurality of possible factors that increase the accident probability.

24. The information processing apparatus according to claim 1, wherein the information includes at least one of a feature in the feature data, information estimated from the feature in the feature data, and information estimated from a type of sensor corresponding to the features in the feature data.

25. The computer-readable storage medium according to claim 11, wherein the steps further comprise:
identifying a plurality of factors that increase the accident probability based on a degree of contribution to an increase in accident probability for each factor;
selecting one of the plurality of factors that increase the accident probability by comparing the degree of contribution for each factor to a threshold value; and
outputting to the user, as the factor the increases the accident probability, the selected one of the plurality of factors.

26. The information processing method according to claim 21, further comprising:
identifying a plurality of factors that increase the accident probability based on a degree of contribution to an increase in accident probability for each factor;
selecting one of the plurality of factors that increase the accident probability by comparing the degree of contribution for each factor to a threshold value; and
outputting to the user, as the factor the increases the accident probability, the selected one of the plurality of factors.

27. The information processing apparatus according to claim 1, wherein the processing circuitry is further configured to display an image of a human character during the output of the sound message so as to indicate that the sound message is being given by the human character.

28. The computer-readable storage medium according to claim 11, wherein the steps further comprise:
displaying an image of a human character during the output of the sound message so as to indicate that the sound message is being given by the human character.

29. The information processing method according to claim 21, further comprising displaying an image of a human character during the output of the sound message so as to indicate that the sound message is being given by the human character.

30. The information processing apparatus according to claim 1, wherein the dangerous driving operation includes an acceleration operation or a braking operation.

* * * * *